United States Patent
Tanimoto et al.

(10) Patent No.: US 8,160,458 B2
(45) Date of Patent: Apr. 17, 2012

(54) OPTICAL PHASE-MODULATION EVALUATING DEVICE

(75) Inventors: Takao Tanimoto, Hadano (JP); Koji Kawakita, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 494 days.

(21) Appl. No.: 12/523,150

(22) PCT Filed: Jan. 10, 2008

(86) PCT No.: PCT/JP2008/000011
§ 371 (c)(1),
(2), (4) Date: Jul. 14, 2009

(87) PCT Pub. No.: WO2008/087854
PCT Pub. Date: Jul. 24, 2008

(65) Prior Publication Data
US 2010/0045999 A1  Feb. 25, 2010

(30) Foreign Application Priority Data

Jan. 16, 2007 (JP) ................................. 2007-007086
Nov. 6, 2007 (JP) ................................. 2007-288869

(51) Int. Cl.
*H04L 27/22* (2006.01)
*H04B 10/06* (2006.01)
(52) U.S. Cl. ...................................... 398/212; 398/188
(58) Field of Classification Search .................. 398/188, 398/212
See application file for complete search history.

(56) References Cited

U.S. PATENT DOCUMENTS

| 6,892,000 | B2 | 5/2005 | Ito |
| 7,864,892 | B2 * | 1/2011 | Ikeuchi et al. ................. 375/329 |
| 2006/0222377 | A1 * | 10/2006 | Hoshida et al. ................ 398/212 |
| 2006/0274320 | A1 | 12/2006 | Caplan |
| 2007/0264029 | A1 | 11/2007 | Suzuki et al. |

FOREIGN PATENT DOCUMENTS

| JP | A 6-21891 | 1/1994 |
| JP | 06-177474 | 6/1994 |
| JP | 09-197679 | 7/1997 |
| JP | A 10-31126 | 2/1998 |
| JP | 2003-043407 A | 2/2003 |
| JP | 2003-167204 | 6/2003 |
| JP | A 2004-93926 | 3/2004 |
| JP | A 2006-287493 | 10/2006 |
| JP | A 2007-306371 | 11/2007 |

* cited by examiner

*Primary Examiner* — Danny Leung
(74) *Attorney, Agent, or Firm* — Greer, Burns & Crain, Ltd.

(57) ABSTRACT

The present invention provides an optical phase modulation evaluating device that can measure and evaluate the precise degree of modulation in phase of an optical phase modulation signal in comparison with the conventionally-known optical phase modulation evaluating device. The optical phase modulation evaluating module includes: a bit delay device located on optical paths of the third and fifth light beams, and adapted to change the length of the optical paths to delay the third and fifth light beams by one bit per second; and an optical phase difference setting means for delaying either or both the ninth and tenth light beams by a designated phase angle which is not equal to zero, the optical phase difference setting means having a light transmissive plate located on an optical path for the ninth light beam, and a light transmissive plate located on an optical path for the tenth light beam.

15 Claims, 18 Drawing Sheets

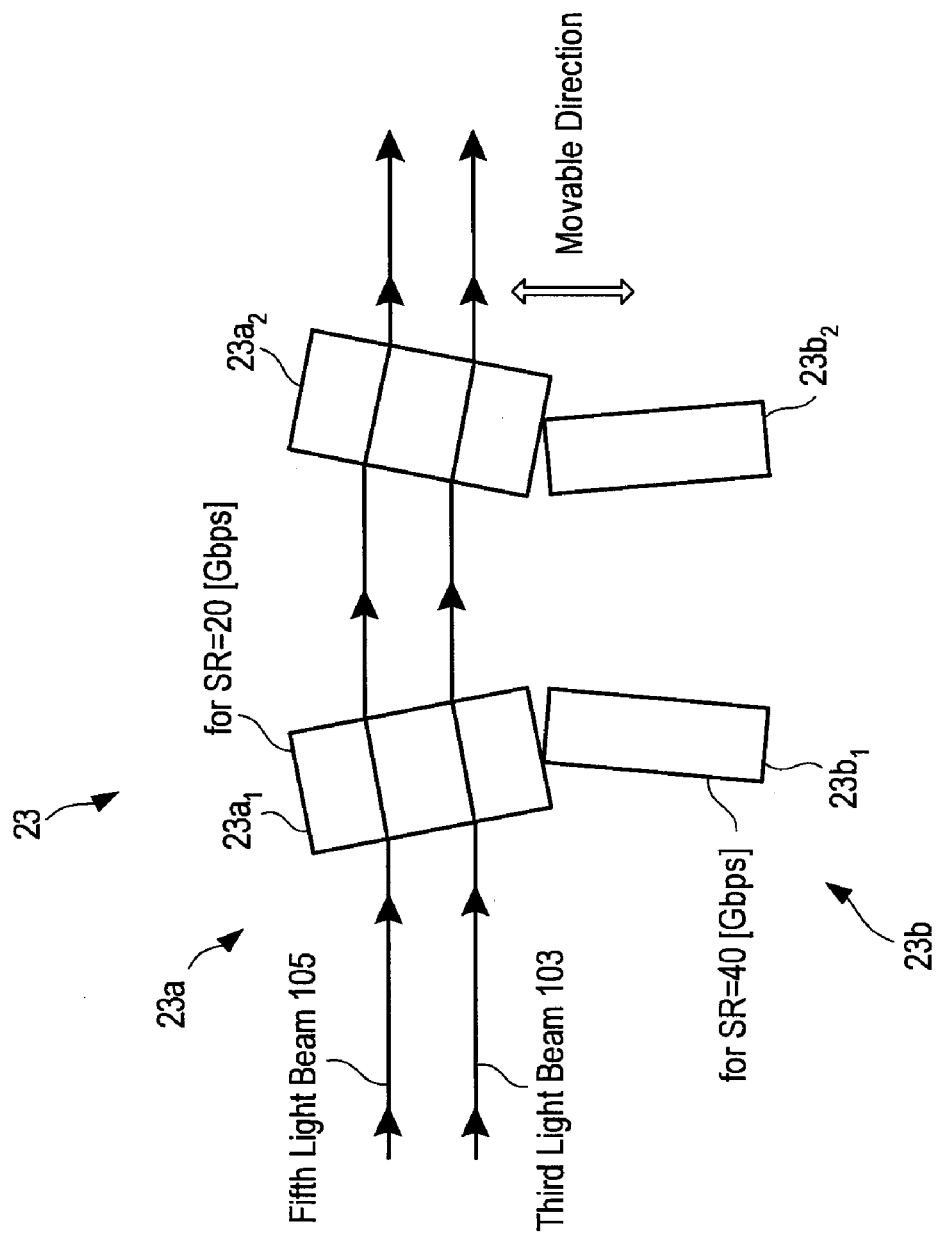

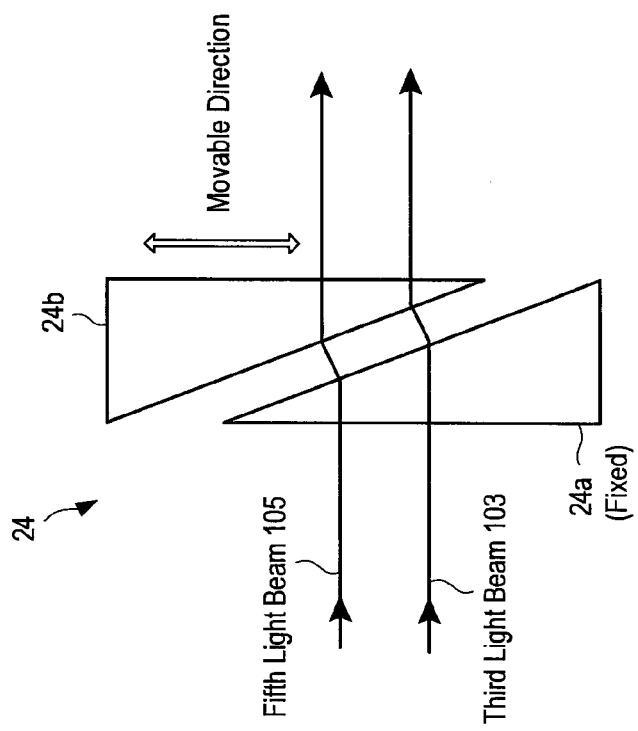

OPTICAL PHASE-MODULATION EVALUATING DEVICE

This application is a U.S. National Phase under 35 U.S.C. §371 of International Application No. PCT/JP2008/000011, filed Jan. 10, 2008.

TECHNICAL FIELD

The present invention relates to an optical phase modulation evaluating device for evaluating an optical phase modulation signal constituted by an optical carrier modulated in phase by a data signal in a coherent optical communication system.

BACKGROUND OF THE INVENTION

A conventional optical phase modulation evaluating device is known as a device for evaluating an optical phase modulation signal defined as a signal modulated in phase by a data signal at a specific symbol rate in a coherent optical communication system, and adapted to perform a phase detection of an optical phase modulation signal by using a bit delay interferometer, and to evaluate an optical phase modulation characteristic of the optical phase modulation signal (see for example a patent document 1).

FIG. 16 is a diagram showing a conventional optical phase modulation evaluating device 1 disclosed in a patent document 1. As shown in FIG. 16, the conventional optical phase modulation evaluating device 1 includes a bit delay interferometer 2, a photosensitive detector (PD) 3, and a signal processing unit 4.

An optical phase modulation signal defined as a signal modulated in phase by a data signal is firstly generated as a signal to be evaluated by the conventional optical phase modulation evaluating device 1, and inputted into a bit delay interferometer 2 constituted as an optical phase detector. The bit delay interferometer 2 is constituted by a Mach-Zehnder interferometer including optical waveguides. In a signal dividing section 2b, the optical phase modulation signal from an input port 2a is divided into lights to be passed through arms 2c and 2d (the bit delay interferometer 2 includes a bit delay device 2f). A synthesizing section 2e combines the light passed through the arm 2c and the light passed through the arm 2d to synthesize light intensity conversion signals to be outputted to the PD 3 through output ports 2g and 2h. As a result, the change in phase of the optical phase modulation signal is converted to the change in light intensity of the light intensity conversion signals. The difference in phase between the light intensity conversion signals is equal to 180 degrees ($\pi$ radian). The light intensity conversion signals are outputted to the PD 3 through output ports 2g and 2h. The bit delay device 2f adds, to the arm 2d, the delay of one bit with respect to the symbol rate to ensure that the arm 2d is larger in length that the arm 2c.

The PD 3 performs a photoelectric conversion of the light intensity conversion signal from the output terminal 2g of the bit delay interferometer 2 to an electric signal. The signal processing unit 4 demodulates the electric signal from the PD 3 into the data signal. Therefore, the conventional optical phase modulation evaluating device 1 can evaluate the optical phase modulation signal on the basis of error rate and waveform obtained from the demodulated signal from the signal processing unit 4.

Patent document 1: Japanese Patent Laid-Open Publication H06-21891

DISCLOSURE OF THE INVENTION

Problems to be Solved by the Invention

However, the above-mentioned conventional optical phase modulation evaluating device cannot measure phase difference between relative bits of the optical phase modulation signal (hereinafter referred to as "phase difference between relative bits"). As a result, the conventional optical phase modulation evaluating device cannot evaluate the precise degree of modulation in phase of an optical phase modulation signal. The reason why the conventional optical phase modulation evaluating device cannot evaluate the precise degree of modulation in phase of an optical phase modulation signal will be described hereinafter. Here, the phase difference between relative bits is represented by reference character "$\Delta\phi\mathrm{mod}$".

The optical phase modulation signal constituted by an optical carrier modulated in phase by the phase difference between relative bits "$\Delta\phi\mathrm{mod}$" is firstly inputted into the input port 2a of the bit delay interferometer 2. The intensity of an electric field of the optical phase modulation signal to be inputted into the input port 2a of the bit delay interferometer 2 is represented by a following expression (1).

$$E = E_0 \cdot \exp\{j(\omega t + \Delta\phi\mathrm{mod})\} \tag{1}$$

The optical phase modulation signal is divided into two lights to be passed through the arms 2c and 2d, while the lights are inputted into the synthesizing section 2e. The intensities "$P_a$" and "$P_b$" of the lights to be passed through the arms 2c and 2d, and the intensities "$E_a$" and "$E_b$" of electric fields of the lights to be passed through the arms 2c and 2d are represented by following expressions (2) to (5).

$$E_a = A_a \cdot \exp\{j(\omega t + \phi a)\} \tag{2}$$

$$E_b = A_b \cdot \exp\{j(\omega t + \phi b)\} \tag{3}$$

$$P_a = |E_a \cdot E_a^*| \tag{4}$$

$$P_b = |E_b \cdot E_b^*| \tag{5}$$

Here, the characters "$\phi a$" and "$\phi b$" are intended to indicate optical phases of the lights to be passed through the arms 2c and 2d. The characters "$E_a^*$" and "$E_b^*$" are intended to indicate complex conjugate numbers of "$E_a$" and "$E_b$". Additionally, the phase difference between relative bits $\Delta\phi\mathrm{mod}$ appearing in the expression (1) is omitted from the expressions (2) and (3) for easier comprehension.

The intensity "P" of a light synthesized by the synthesizing section 2e is represented by a following expression (6) derived from the expressions (2) and (3).

$$P = (E_a + E_b) \cdot (E_a^* + E_b^*) = A_a^2 + A_b^2 + 2 \cdot A_a \cdot A_b \cdot \cos(\varphi a - \varphi b) \tag{6}$$

Then, the light intensity of the synthesized light is represented by the following expression (7) on the basis of the intensities of the electric fields $A_a = A_b = \frac{1}{2}$ and the phase difference between relative bits "$\Delta\phi\mathrm{mod}$". When the phase difference "$\phi a - \phi b$" between arms "2c" and "2d" is replaced by a reference character "$\phi$", the light intensity of the synthesized light is represented by the following expression (8).

$$P = 0.5 + 0.5 \cos(\Delta\phi\mathrm{mod} + \phi a - \phi b) \tag{7}$$

$$P = 0.5 + 0.5 \cos(\Delta\phi\mathrm{mod} + \phi) \tag{8}$$

Additionally, the arm 2c is equal in optical phase to the arm 2d φa=φb). In other words, the synthesized light is represented by a following expression (10) when the phase difference between the arms φ is equal to zero.

$$P=0.5+0.5\cos(\Delta\phi\text{mod}) \quad (9)$$

Here, the light intensity "P" represented by the expression (9) indicates the light intensity of the light intensity modulation signal from the port 2g or 2h. Therefore, the light intensity modulation signals "$P_1$" and "$P_2$" from the port 2g and 2h are represented by the following expressions (10) and (11), and differ in phase by π radian (180 degrees).

$$P_1=0.5+0.5\cos(\Delta\phi\text{mod}) \quad (10)$$

$$P_2=0.5-0.5\cos(\Delta\phi\text{mod}) \quad (11)$$

As a result, the light intensity modulation signals "$P_1$" represented by the expression (10) is inputted into the PD 3. The offset power appearing in the expression (10) is cancelled. The light intensity "$I_\alpha$" corresponding to the output signal "P" to be outputted from the signal processing unit 12 is represented by a following expression (12).

$$I_{60} \propto 0.5\cos(\Delta\phi\text{mod}) \quad (12)$$

However, one light intensity "$I_\alpha$" corresponds to two phase difference between relative bits "Δφmod" as shown in FIG. 7. As a result, the signal processing device 4 does not identify one of the phase differences between relative bits "Δφmod" from the expression (12) on the basis of previously calculated relation between the light intensity "$I_\alpha$" and the phase difference between relative bits "Δφmod". Therefore, the conventional optical phase modulation evaluating device can not measure and evaluate the precise degree of modulation in phase of an optical phase modulation signal by reason that the signal processing device 4 does not identify one of the phase differences between relative bits "Δφmod".

It is therefore an object of the present invention to provide an optical phase modulation evaluating device which can measure and evaluate the precise degree of modulation in phase of an optical phase modulation signal in comparison with the conventional optical phase modulation evaluating device.

Means for Solving the Problems

The optical phase modulation evaluating device according to the present invention defined in claim 1, comprises: an optical input unit (11) for inputting, as an optical phase modulation signal (a), a signal modulated in phase by a data signal at a designated symbol rate; an optical dividing unit (12) for dividing the optical phase modulation signal (a) inputted by the optical input unit (11) into a first light beam (101) and a second light beam (102); a beam splitter (13a) for splitting the first light beam (101) into a third light beam (103) and a fourth light beam (104), and splitting the second light beam (102) into a fifth light beam (105) and a sixth light beam (106); a first mirror (14a) for reflecting the third light beam (103) to output a reflected light beam as a seventh light beam (107), and reflecting the fifth light beam (105) to output a reflected light beam as an eighth light beam (108); a second mirror (14b) for reflecting the fourth light beam (104) to output a reflected light beam as a ninth light beam (109), and reflecting the sixth light beam (106) to output a reflected light beam as a tenth light beam (110); a synthesizer (13b) for combining the eighth light beam (108) with the tenth light beam (110) to synthesize a first light intensity conversion signal (111) and a second light intensity conversion signal (112) differing in phase by π radian from the first light intensity conversion signal (111), and combining the seventh light beam (107) with the ninth light beam (109) to synthesize a third light intensity conversion signal (113) and a fourth light intensity conversion signal (114) differing in phase by π radian from the third light intensity conversion signal (113), the change in phase of the optical phase modulation signal (a) being converted to the change in light intensity of the first and second light intensity conversion signals (111) and (112) and the change in light intensity of the third and fourth light intensity conversion signals (113) and (114) by the synthesizer (13b); a bit delay device (15) for adding, to the optical phase modulation signal (a), the delay of one bit with respect to the symbol rate on two optical paths from the beam splitter (13a) to the synthesizer (13b) through the first mirror (14a) or two optical paths from the beam splitter (13a) to the synthesizer (13b) through the second mirror (14b); an optical phase difference setting means (16) located on two optical path from the beam splitter (13a) to the synthesizer (13b) through the first mirror (14a) or two optical path from the beam splitter (13a) to the synthesizer (13b) through the second mirror (14b), and adapted to add a designated delay to the phase of the optical phase modulation signal (a); a first light receiving unit (120) for converting at least one of the first and second light intensity conversion signals (111 and 112) to an electric signal; a second light receiving unit (130) for converting at least one of the third and fourth light intensity conversion signals (113 and 114) to an electric signal; and a signal processing unit (140) for analyzing the optical phase modulation signal (a) on the basis of output signals of the first and second light receiving units (120 and 130).

The optical phase modulation evaluating device according to the present invention defined in claim 1 can identify each of phase differences between relative bits, by reason that the optical phase modulation evaluating device according to the present invention defined in claim 1 comprises two optical interferometers, and set the difference between a phase difference obtained from the optical interferometers and a phase difference caused by the other of the optical interferometers to a predetermined value. Therefore, the optical phase modulation evaluating device according to the present invention defined in claim 1 can evaluate the precise degree of modulation in phase of an optical phase modulation signal in comparison with the conventional optical phase modulation evaluating device.

In the optical phase modulation evaluating device according to the present invention defined in claim 2, the optical phase difference setting means (16) is adapted to set the difference between the phase delay to be added to the ninth light beam (109) and the phase delay to be added to the tenth light beam (110) to π/2 radian.

The optical phase modulation evaluating device according to the present invention defined in claim 2 makes it easy to identify the phase difference between relative bits, and can evaluate the precise degree of modulation in phase of an optical phase modulation signal in comparison with the conventional optical phase modulation evaluating device.

In the optical phase modulation evaluating device according to the present invention defined in claim 3, the bit delay device (15) is adapted to select one of predetermined optical path lengths on the basis of the symbol rate.

The optical phase modulation evaluating device according to the present invention defined in claim 3 can evaluate the precise degree of modulation in phase of the optical phase modulation signal on the basis of the symbol rate.

In the optical phase modulation evaluating device according to the present invention defined in claim 4, the bit delay device (15) includes two or more pairs of parallel plates (21a and 21b) made of light transmissive material, the pairs of the parallel plates (21a and 21b) correspond to respective symbol rates, and are selectively employed to set the delay of one bit with respect to the symbol rate of the optical phase modulation signal (a).

Therefore, the optical phase modulation evaluating device according to the present invention defined in claim 4 make it easy to add the delay of one bit with respect to the symbol rate.

In the optical phase modulation evaluating device according to the present invention defined in claim 5, the bit delay device (15) includes two or more pairs of first and second parallel plates (23a1 and 23b1, 23a2 and 23b2) made of light transmissive material and inclined with respect to each other, the pairs of first and second parallel plates (23a1 and 23b1, 23a2 and 23b2) correspond to respective symbol rates, and are selectively employed to set the delay of one bit with respect to the symbol rate of the optical phase modulation signal (a).

The optical phase modulation evaluating device according to the present invention defined in claim 5 can change the optical path length corresponding to the symbol rate by switching between the pairs of first and second parallel plates.

In the optical phase modulation evaluating device according to the present invention defined in claim 6, the bit delay device (15) is constituted by a pair of light transmissive members (24a and 24b) movable with respect to each other, the light transmissive members having the shape in cross section of a triangle, a surface of one of the light transmissive members being in face-to-face relationship with a surface of the other of the light transmissive members, the delay of one bit with respect to the symbol rate of the optical phase modulation signal (a) is adjustable by the parallel plates (24a and 24b).

The optical phase modulation evaluating device according to the present invention defined in claim 6 can set the delay of one bit with respect to the symbol rate by reason that one of the triangle-shaped light transmissive members is moved with respect to the other of the triangle-shaped light transmissive members when the optical path length is adjusted by the bit delay device (15).

The optical phase modulation evaluating device according to the present invention defined in claim 7 may further comprise optical phase difference adjusting means (31) for delaying light beams on two optical path from the beam splitter (13a) to the synthesizer (13b) through the first mirror (14a) or two optical path from the beam splitter (13a) to the synthesizer (13b) through the second mirror (14b), wherein an initial phase ($\phi$) corresponding to the phase difference between relative bits to be calculated by the signal processing unit (140) is adjustable by the optical phase difference adjusting means (31).

The optical phase modulation evaluating device according to the present invention defined in claim 7 can set an initial phase ($\phi$).

In the optical phase modulation evaluating device according to the present invention defined in claim 8, the first light receiving unit (120) is constituted by a balanced receiver for detecting the difference between the first and second light intensity conversion signals (111 and 112), and the second light receiving unit (130) is constituted by a balanced receiver for receiving the difference between the third and fourth light intensity conversion signals (113 and 114).

In the optical phase modulation evaluating device according to the present invention defined in claim 8, the difference between the first and second light intensity conversion signals can be converted to an electric signal to be outputted to the signal processing unit. The difference between the third and fourth light intensity conversion signals can be converted to an electric signal to be outputted to the signal processing unit.

In the optical phase modulation evaluating device according to the present invention defined in claim 9, the optical dividing unit (12) may include an optical coupler (12b).

The optical phase modulation evaluating device according to the present invention defined in claim 9 can divide the optical phase modulation signal into first and second light beams.

In the optical phase modulation evaluating device according to the present invention defined in claim 10, the optical phase difference setting means (16) is constituted by parallel plates (16a and 16b) made of light transmissive material, and pivotally movable around their axes, the optical phase difference setting means (16) is adapted to add, to the phase, the delay corresponding to an incidence angle of light to the parallel plate (16a) or the parallel plate (16b).

The optical phase modulation evaluating device according to the present invention defined in claim 10 can evaluate the precise degree of modulation in phase of an optical phase modulation signal in comparison with the conventional optical phase modulation evaluating device when setting the delay based on the changed wavelength of the optical phase modulation signal, and when setting the delay based on the optical path length changed by the temperature.

In the optical phase modulation evaluating device according to the present invention defined in claim 11, the optical phase difference setting means (16) is constituted by a pair of parallel plates (16e and 16f) made of light transmissive material, and inclined with respect to each other, wherein the optical phase difference setting means (16) is adapted to add, to the phase, the delay corresponding to an incidence angle of light to the parallel plate (16e) or the parallel plate (16f).

The optical phase modulation evaluating device according to the present invention defined in claim 11 can reduce the beam shift of the transmitted light beam from the phase delay device.

The optical phase modulation evaluating device according to the present invention defined in claim 12 may further comprise optical path length adjusting means (41) located on an optical path from the synthesizer (13b) to the first light receiving unit (120) or an optical path from the synthesizer (13b) to the second light receiving unit (130), wherein phases of the electric signals from the first and second light receiving units (120 and 130) are adjustable by the optical path length adjusting means (41).

The optical phase modulation evaluating device according to the present invention defined in claim 12 can adjust the phase difference between the electric signals from the first and second light receiving units to $\pi$ radian (180 degrees) by reason that the optical path length adjusting means (41) adjusts the optical path length.

The optical phase modulation evaluating device according to the present invention defined in claim 13, comprises: an optical input unit (11) for inputting, as an optical phase modulation signal (a), a signal modulated in phase by a data signal at a designated symbol rate; an optical dividing unit (12) for dividing the optical phase modulation signal (a) inputted by the optical input unit (11) into a first light beam (101) and a second light beam (102); a beam splitter (13a) for splitting the first light beam (101) into a third light beam (103) and a fourth light beam (104), and splitting the second light beam (102) into a fifth light beam (105) and a sixth light beam (106); a first mirror (51a) for reflecting the fourth light beam (104) to output a reflected light beam as a seventh light beam (107), and reflecting the sixth light beam (106) to output a reflected light beam as an eighth light beam (108); a second mirror (51b) for reflecting the seventh light beam (107) to output a reflected light beam as a ninth light beam (109), and reflecting the eighth light beam (108) to output a reflected light beam as a tenth light beam (110); a synthesizer (13b) for combining the fifth light beam (105) with the eighth light beam (108) to synthesize a first light intensity conversion signal (111) and a second light intensity conversion signal (112) differing in phase by π radian from the first light intensity conversion signal (111), and combining the third light beam (103) with the ninth light beam (109) to synthesize a third light intensity conversion signal (113) and a fourth light intensity conversion signal (114) differing in phase by π radian from the third light intensity conversion signal (113), the change in phase of the optical phase modulation signal (a) being converted to the change in light intensity of the first and second light intensity conversion signals (111) and (112) and the change in light intensity of the third and fourth light intensity conversion signals (113) and (114) by the synthesizer (13b); a bit delay device (52) for delaying the optical phase modulation signal (a) by one bit per second on two optical paths from the beam splitter (13a) to the synthesizer (13b); an optical phase difference setting means (16) for delaying the optical phase modulation signal (a) by a designated phase angle on two optical path from the beam splitter (13a) to the synthesizer (13b) through the first mirror (51a) and the second mirror (51b), or two optical path from the beam splitter (13a) to the synthesizer (13b) through the bit delay device (52); a first light receiving unit (120) for converting to an electric signal in response to at least one of the first and second light intensity conversion signals (111 and 112); a second light receiving unit (130) for converting to an electric signal in response to at least one of the third and fourth light intensity conversion signals (113 and 114); and a signal processing unit (140) for analyzing the optical phase modulation signal (a) on the basis of output signals of the first and second light receiving units (120 and 130).

The optical phase modulation evaluating device according to the present invention defined in claim 13 can identify each of phase differences between relative bits, by reason that the optical phase modulation evaluating device according to the present invention defined in claim 1 comprises two optical interferometers, and set the difference between a phase difference obtained from the optical interferometers and a phase difference caused by the other of the optical interferometers to a predetermined value. Therefore, the optical phase modulation evaluating device according to the present invention defined in claim 1 can evaluate the precise degree of modulation in phase of an optical phase modulation signal in comparison with the conventional optical phase modulation evaluating device.

In the optical phase modulation evaluating device according to the present invention defined in claim 14, the optical phase difference setting means (16) is adapted to set the difference between the phase delay to be added to the ninth light beam (109) and the phase delay to be added to the tenth light beam (110) to π/2 radian.

The optical phase modulation evaluating device according to the present invention defined in claim 14 makes it easy to identify the phase difference between relative bits, and evaluate the precise degree of modulation in phase of an optical phase modulation signal in comparison with the conventional optical phase modulation evaluating device.

In the optical phase modulation evaluating device according to the present invention defined in claim 15, the bit delay device (52) includes an input mirror (52a) for reflecting light beams from the beam splitter (13a), a corner mirror (52b) for reflecting light beams from the input reflector (52a) in a direction opposite to the travelling direction of the light beams from the input reflector (52a), and an output mirror (52c) for reflecting light beams from the corner mirror (52b) to output reflected light beams to the synthesizer (13b), wherein the corner mirror (52b) is movable with respect to the input mirror (52a) and the output mirror (52c) in directions necessary to change in length of an optical path from the input mirror (52a) to the corner mirror (52b) and an optical path from the corner mirror (52b) to the output mirror (52c).

The optical phase modulation evaluating device according to the present invention defined in claim 15 can set arbitrarily a delay on the optical path defined with the bit delay device (52).

Advantageous Effect of the Invention

The present invention is to provide an optical phase modulation evaluating device having an advantageous effect of measuring and evaluating the precise degree of modulation in phase of the optical phase modulation signal in comparison with the conventional optical phase modulation evaluating device.

BRIEF DESCRIPTION OF THE DRAWINGS

FIG. 8 is a block diagram showing another example of a bit delay device of the optical phase modulation evaluating module according to the second embodiment of the present invention.

EXPLANATION OF THE REFERENCE NUMERALS

Figure 1:
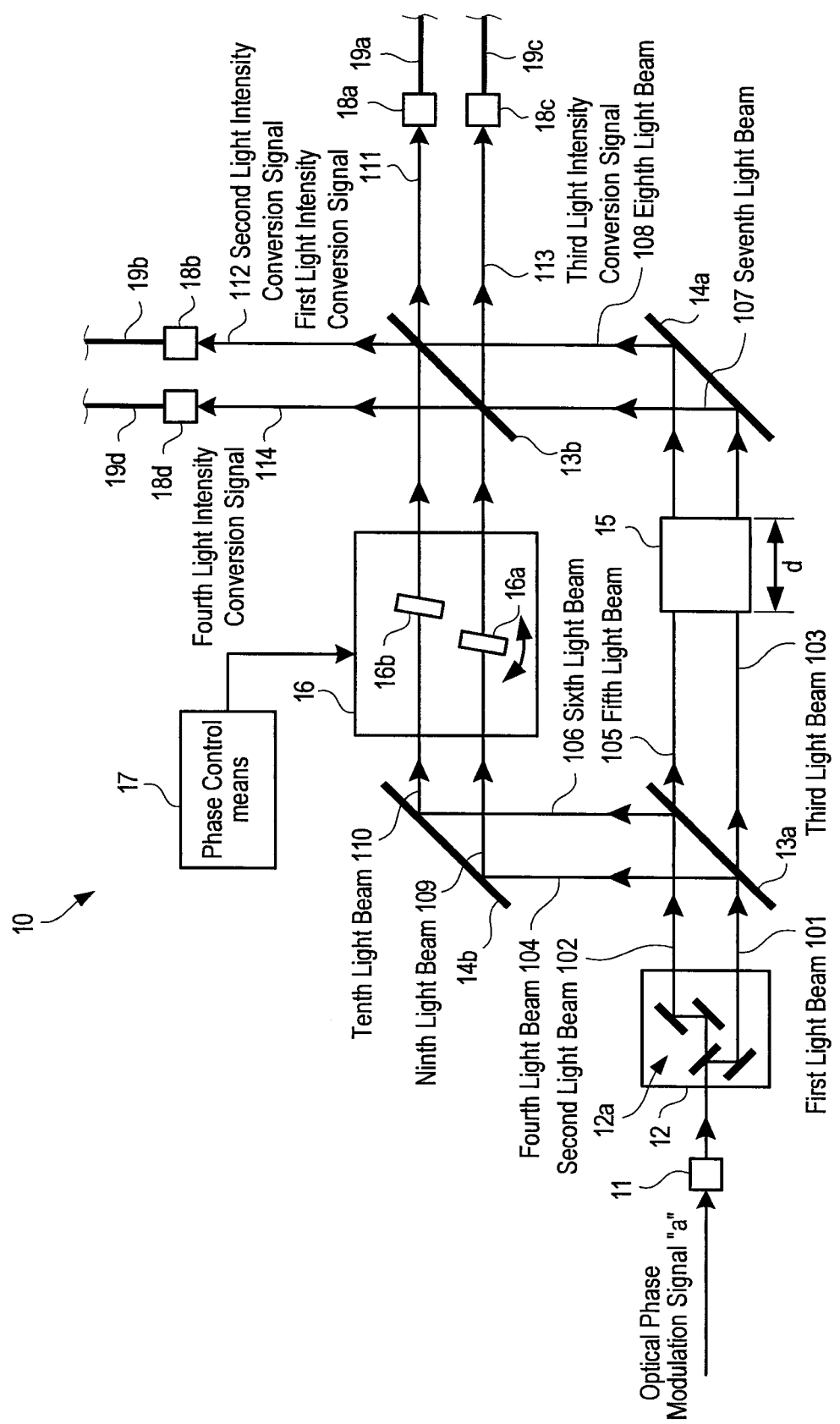
FIG. 1 is a block diagram showing the construction of an optical phase modulation evaluating module according to the first embodiment of the present invention.

10: optical phase modulation evaluating module
11: optical input unit
12: optical dividing unit
12a: mirrors
12b: optical coupler
13a: BS (beam splitter)
13b: BS (beam splitter)
14a: first mirror
14b: second mirror
15: bit delay device
15a and 15b: light transmissive plates
16: optical phase difference setting device (optical phase difference setting means)
16a to 16f: light transmissive plates
16g: retaining plate
17: phase control means
18a: first optical output unit
18b: second optical output unit
18c: third optical output unit
18d: fourth optical output unit
19a to 19d: optical fiber
20: optical phase modulation evaluating module
21: bit delay device
21a and 21b: light transmissive plates
22: delay setting means
23: bit delay device
23a (23a1, 23a2) and 23b (23b1, 23b2): light transmissive plates
24a (24a, 24b): light transmissive objects
30: optical phase modulation evaluating module
31: delay unit for adjusting a phase difference (optical phase difference adjusting means)
40: optical phase modulation evaluating module
41: phase adjuster (light length adjusting means)
41a, 41c, 41d, and 41f: mirrors
41b and 41e: corner mirrors
50: optical phase modulation evaluating module
51a: first mirror
51b: second mirror
52: bit delay device
52a: input side mirror
52b: corner mirror
52c: output side mirror
60: optical phase modulation evaluating module
70: optical phase modulation evaluating device
71 and 72 mirrors
73a to 73d: lenses
100 and 200: optical phase modulation evaluating device
101: first light beam
102: second light beam
103: third light beam
104: fourth light beam
105: fifth light beam
106: sixth light beam
107: seventh light beam
108: eighth light beam
109: ninth light beam
110: tenth light beam
111: first light intensity conversion signal
112: second light intensity conversion signal
113: third light intensity conversion signal
114: fourth light intensity conversion signal
120 and 130: balanced receivers
121, 122, 131, and 132: PD
123 and 133: subtracters
140: signal processing unit
150: display unit
201: optical sampling unit

PREFERRED EMBODIMENTS OF THE INVENTION

The first to seventh embodiments of the optical phase modulation evaluating device according to the present invention will be described hereinafter in detail with reference to accompanying drawings.

(First Embodiment)

The construction of the optical phase modulation evaluating device according to the first embodiment of the present invention, more specifically, an optical phase modulation evaluating module of the optical phase modulation evaluating device will be described hereinafter.

As shown in FIG. 1, the optical phase modulation evaluating module 10 comprises: an optical input unit 11 for inputting an optical phase modulation signal "a"; an optical dividing unit 12 for dividing the inputted optical phase modulation signal "a" into a first light beam 101 and a second light beam 102; a beam splitter (hereinafter simply referred to as "BS") 13a for splitting the first light beam 101 into a third light beam 103 and a fourth light beam 104, and splitting the second light beam 102 into a fifth light beam 105 and a sixth light beam 105; a first mirror 14a for reflecting the third light beam 103 to output the reflected light beam as a seventh light beam 107, and reflecting the fifth light beam 105 to output the reflected light beam as an eighth light beam 108; and a second mirror 14b for reflecting the fourth light beam 104 to output the reflected light beam as a ninth light beam 109, and reflecting the sixth light beam 106 to output the reflected light beam as a tenth light beam 110.

The optical phase modulation evaluating module 10 further comprises a beam splitter (hereinafter simply referred to as "BS") 13b for outputting a first light intensity conversion signal 111 and a second light intensity conversion signal 112 by combining the eighth and tenth light beams 108 and 110, and outputting a third light intensity conversion signal 113 and a fourth light intensity conversion signal 114 by combining the seventh and ninth light beams 107 and 109. When the eighth and tenth light beams 108 and 110 are combined by the BS 13b, the change in phase of the optical phase modulation signal "a" is converted to the light intensity change of the first and second light intensity conversion signals 111 and 112. The phase difference between the first and second light intensity conversion signals 111 and 112 is equal to $\pi$ radian. When the seventh and ninth light beams 107 and 109 are combined by the BS 13b, the change in phase of the optical phase modulation signal "a" is converted to the light intensity change of the third and fourth light intensity conversion signals 113 and 114. The phase difference between the third and fourth light intensity conversion signals 113 and 114 is equal to π radian. The optical phase modulation evaluating module 10 further comprises a bit delay device 15 having an optical path increased by a length necessary to delay the third and fifth light beams 103 and 105, an optical phase difference setting device 16 for setting an optical phase difference and, a phase control means 17 for designating the optical phase difference setting device 16 to set the designated optical phase difference.

The optical phase modulation evaluating module 10 further includes: a first optical output unit 18a for outputting the first light intensity conversion signal 111 to an optical fiber 19a; a second optical output unit 18b for outputting the second light intensity conversion signal 112 to an optical fiber 19b; a third optical output unit 18c for outputting the third light intensity conversion signal 113 to an optical fiber 19c; and a fourth optical output unit 18d for outputting the fourth light intensity conversion signal 114 to an optical fiber 19d.

Here, the optical phase modulation evaluating module 10 includes first and second Mach-Zehnder interferometers.

The first Mach-Zehnder interferometer has an optical path (eleventh optical path) extending from the optical input unit 11 to the first optical output unit 18a through the optical dividing unit 12, the BS 13a, the second mirror 14b, and the BS 13b, and an optical path (twelfth optical path) extending from the optical input unit 11 to the second optical output unit 18b through the optical dividing unit 12, the BS 13a, the first mirror 14a, and the BS 13b.

The second Mach-Zehnder interferometer has an optical path (twenty-first optical path) extending from the optical input unit 11 to the third optical output unit 18c through the optical dividing unit 12, the BS 13a, the second mirror 14b, and the BS 13b, and an optical path (twenty-second optical path) extending from the optical input unit 11 to the fourth optical output unit 18d through the optical dividing unit 12, the BS 13a, the first mirror 14a, and the BS 13b.

The optical input unit 11 has one or more lenses for collimating an inputted light beam, and adapted to input an optical phase modulation signal "a" constituted by an optical carrier modulated in phase by a data signal at a designated symbol rate. And more specifically, the optical input unit 11 is adapted to input an optical phase modulation signal "a" constituted by an optical carrier modulated in phase at a rate of 20 Gbps, 40 Gbps or the like on the basis of the differential phase shift keying (DPSK), the Differential Quadrature Phase Shift Keying (DQPSK), or the like. Additionally, the optical phase modulation signal "a" to be inputted by the optical input unit 11 may be constituted by an optical carrier modulated by a data signal at other symbol rate on the basis of other phase modulation method.

The optical dividing unit 12 has a plurality of mirrors (as shown in FIG. 1) operable to divide the light beam inputted by the optical input unit 11 into a first light beam 101 and a second light beam 102.

The BS 13a is constituted by, for example, a non-polarization beam splitter, and adapted to divide the inputted light beam into a reflected light and a transmitted light, and outputs the reflected light and the transmitted light. Here, the BS 13a corresponds to a branching filter in the present invention.

And more specifically, the BS 13a is adapted to divide the first light beam 101 from the optical dividing unit 12 into a transmitted light and a reflected light, to output the transmitted light as the third light beam 103, and to output the reflected light as the fourth light beam 104. Further, the BS 13a is adapted to divide the second light beam 102 from the optical dividing unit 12 into a transmitted light and a reflected light, to output the transmitted light as the fifth light beam 105, and to output the reflected light as the sixth light beam 106.

The bit delay device 15 has two light transmissive plates made of for example silica glass, and located on the optical paths of the third light beam 103 and the fifth light beam 105. The bit delay device 15 is adapted to increase the optical paths of the third and fifth light beams 103 and 105 to add, to the third and fifth light beams 103 and 105, the delay of one bit with respect to the symbol rate when the third light beam 103 and the fifth light beam 105 are passed through the bit delay device 15.

Here, the thickness "d" of the light transmissive plate is calculated from a following expression (13). The reference characters "t", "n", and "c" are intended to indicate delay time, refraction index in space, and speed of light in vacuum.

$$d = c \times t / (n-1) \quad (13)$$

The delay "t" of one bit with respect to the symbol rate "SR" of the optical phase modulation signal "a" to be inputted into the light input unit 11 is calculated from t=1/SR. When SR=40 [Gbps], t=25 [ps]. When SR=20 [Gbps], t=50 [ps]. Therefore, the optical path differences "d" corresponding to the delay times "t"=25 [ps] and "t"=50 [ps] are calculated from a following expression (20), and as follows.

When SR=40 [Gbps], d=15 [mm]. When SR=20 [Gbps], d=30 [mm].

As explained above, the bit delay device 15 is adapted to add, to two optical paths of each of the first and second Mach-Zehnder interferometers, the optical path difference of one bit with respect to the symbol rate of the optical phase modulation signal "a".

Figure 2:
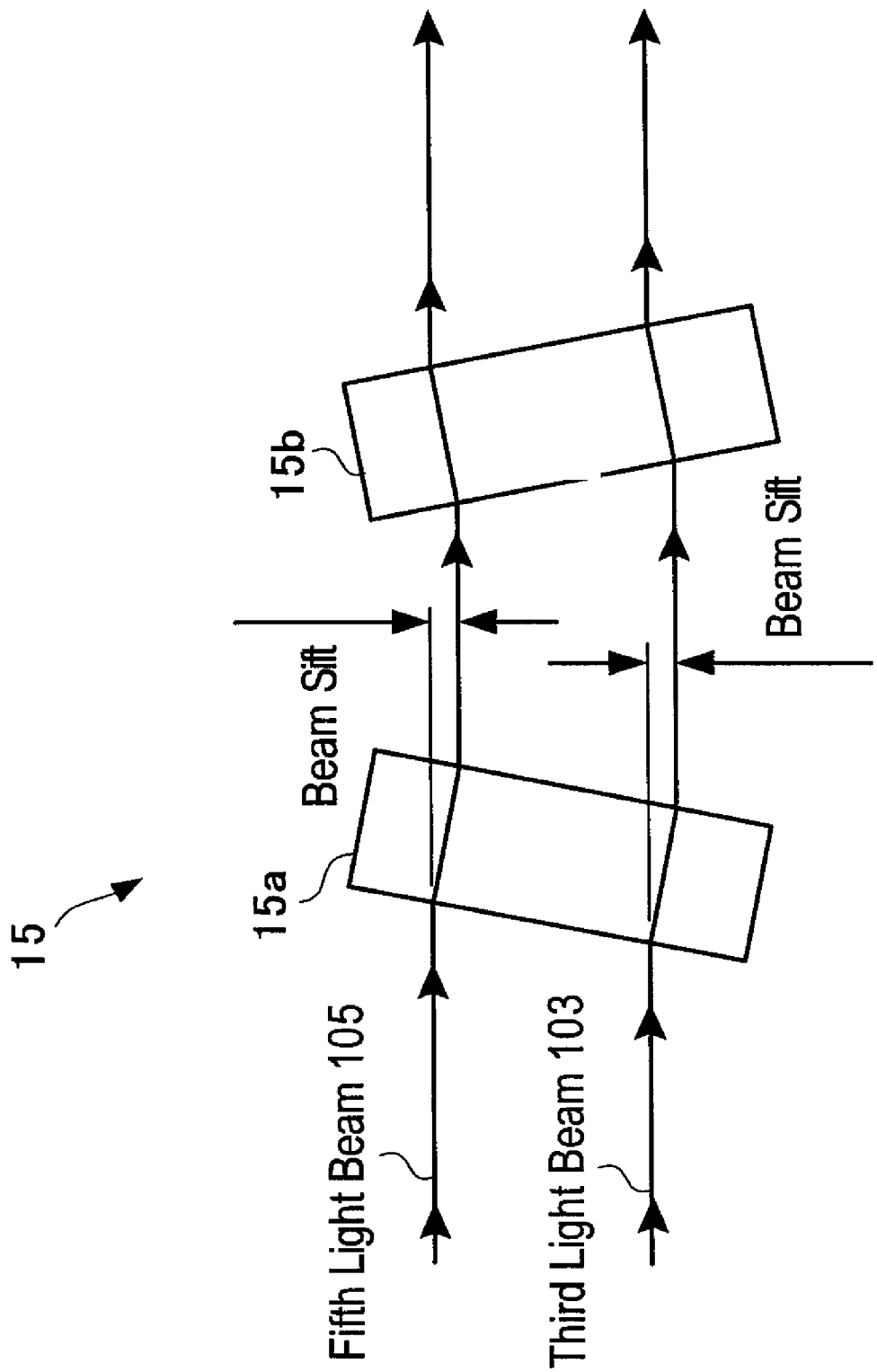
FIG. 2 is a block diagram showing another example of a bit delay device of the optical phase modulation evaluating module according to the first embodiment of the present invention.

On the other hand, the bit delay device 15 is not limited by the above-mentioned construction. For example, as shown in FIG. 2, the bit delay device 15 may be constituted by light transmissive plates 15a and 15b symmetrically inclined with respect to each other under the condition that the incidence angles of the third and fifth light beams 103 and 105 to the light transmissive plate 15a are equal to the output angles of the third and fifth light beams 103 and 105 to the light transmissive plate 15b. Each of the light transmissive plates 15a and 15b has a pair of surfaces parallel to each other. The light transmissive plates 15a and 15b are the same in refractive index as each other.

Additionally, the bit delay deice 15 may be constituted by the light transmissive plate 15a or the light transmissive plate 15b. When, for example, the third and fifth light beams 103 and 105 are reflected and passed through the light transmissive plate 15a, the incidence angles of the third and fifth light beams 103 and 105 to the light transmissive plate 15a are slightly different from the output angles of the third and fifth light beams 103 and 105 to the light transmissive plate 15a (through the influence of beam shift effect). The substantial influence of beam shift effect is relatively small in comparison with the width of the light beam. Further, the beam shift effect can be reduced or cancelled by two light transmissive plates 15a and 15b symmetrically inclined with respect to each other as shown in FIG. 2. Further, the bit delay deice 15 shown in FIG. 2 can reduce the returning light by reason that the incidence angle of the third and fifth light beams 103 and 105 is larger than zero.

The construction of the optical phase modulation evaluating module 10 will be further described hereinafter with reference to FIG. 1.

The first mirror 14a reflects the third light beam 103 and the fifth light beam 105 passed through the bit delay device 15, and outputs the reflected light beams as the seventh light beam 107 and the eighth light beam 108 to the beam splitter 13b.

The second mirror 14b reflects the fourth light beam 104 and the sixth light beam 106, and outputs the reflected light beams as the ninth light beam 109 and the tenth light beam 110 to the optical phase difference setting device 16.

The optical phase difference setting device 16 includes a light transmissive plate 16a located on an optical path of the ninth light beam 109, and a light transmissive plate 16b located on an optical path of the tenth light beam 110.

It is possible to set the delay of the bit delay device 15 in view of the delay of the optical phase difference setting device 16 by setting the delay between two arms of each of the Mach-Zehnder interferometers to the delay of one bit with respect to the symbol rate.

The light transmissive plate 16a is movable around its axis in the direction of arrows shown in FIG. 1, and can change the optical path length of the ninth light beam 109. On the other hand, the incidence angle of the tenth light beam 110 to the light transmissive plate 16b is not changed.

Further, the optical phase difference setting device 16 is not limited by the above-mentioned construction. The optical phase difference setting device 16 shown in FIG. 3 has light transmissive plates 16c and 16d located on the optical path of the tenth light beam 110, retaining plates 16g and 16h, and light transmissive plates 16c and 16d retained by the retaining plates 16g and 16h and located on the optical path of the ninth light beam 109.

The tenth light beam 110 is passed through the light transmissive plates 16c and 16d symmetrically inclined with respect to each other under the condition that the incidence angle of the tenth light beam 110 to the light transmissive plate 16c is substantially equal to the output angle of the tenth light beam 110 to the light transmissive plate 16c.

The ninth light beam 109 is passed through the light transmissive plates 16e and 16f symmetrically inclined with respect to each other under the condition that the incidence angle of the ninth light beam 109 to the light transmissive plate 16e is substantially equal to the output angle of the ninth light beam 109 to the light transmissive plate 16f. The retaining tables 16g and 16h for the light transmissive plates 16e and 16f are pivotably movable around their axes in directions "A" and "B" shown in FIG. 3. Therefore, it is possible to set the phase difference between the ninth and tenth light beams 109 and 110.

Figure 3:
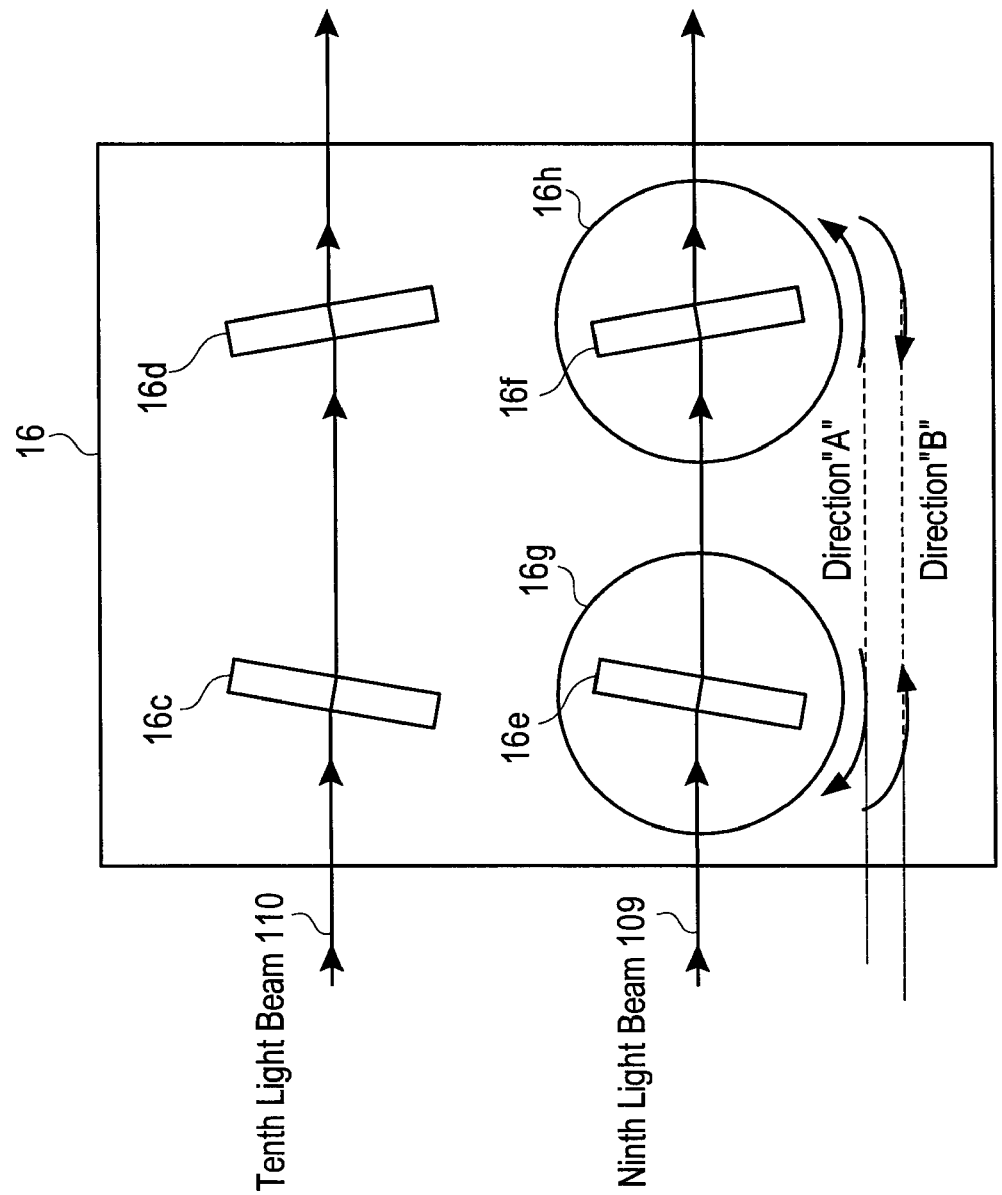
FIG. 3 is a block diagram showing another example of an optical phase difference setting device of the optical phase modulation evaluating module according to the first embodiment of the present invention.

As will be seen from FIG. 3, the optical phase difference setting device 16 thus constructed can reduce or cancel the beam shift of the light beam by reason that the light transmissive plates 16c and 16d are symmetrically inclined with respect to each other at predetermined angles, the light transmissive plates 16e and 16f are symmetrically inclined with respect to each other at predetermined angles. Further, the optical phase difference setting device 16 thus constructed can ion defined in claim 11 can reduce the returning light by reason that the incidence angle of the ninth and tenth light beams 109 and 110 is larger than zero.

The operation of the optical phase modulation evaluating module 10 will be further described hereinafter with reference to FIG. 1.

The BS 13b has, for example, a non-polarizing beam splitter for combining two light beams to synthesize two light intensity conversion signals differing in phase by π radian from each other. The change in phase of the optical phase modulation signal (a) being converted to the change in light intensity of the light intensity conversion signals by the BS 13b. The BS 13b corresponds to a synthesizer in the present invention.

More specifically, the BS 13b combines the eighth light beam 108 with the tenth light beam 110 to synthesize a first light intensity conversion signal 111 and a second light intensity conversion signal 112 differing in phase by π radian from the first light intensity conversion signal 111, and combining the seventh light beam 107 with the ninth light beam 109 to synthesize a third light intensity conversion signal 113 and a fourth light intensity conversion signal 114 differing in phase by π radian from the third light intensity conversion signal 113, the change in phase of the optical phase modulation signal "a" being converted to the change in light intensity of the first and second light intensity conversion signals 111 and 112 and the change in light intensity of the third and fourth light intensity conversion signals 113 and 114 by the BS 13b.

The first to fourth optical output units 18a to 18d have lenses for focusing the first to fourth light intensity conversion signals 111 to 114 on the optical fibers 19a to 19d, respectively.

The first optical output unit 18a is adapted to output, to the optical fiber 19a, the first light intensity conversion signal 111 received from the BS 13b. The second optical output unit 18b is adapted to output, to the optical fiber 19b, the second light intensity conversion signal 112 received from the BS 13b. The third optical output unit 18c is adapted to output, to the optical fiber 19c, the third light intensity conversion signal 113 received from the BS 13b. The fourth optical output unit 18d is adapted to output, to the optical fiber 19d, the fourth light intensity conversion signal 114 received from the BS 13b.

The following description is directed to the construction of an optical phase modulation evaluating device comprising the above-mentioned optical phase modulation evaluating module 10.

Figure 4:
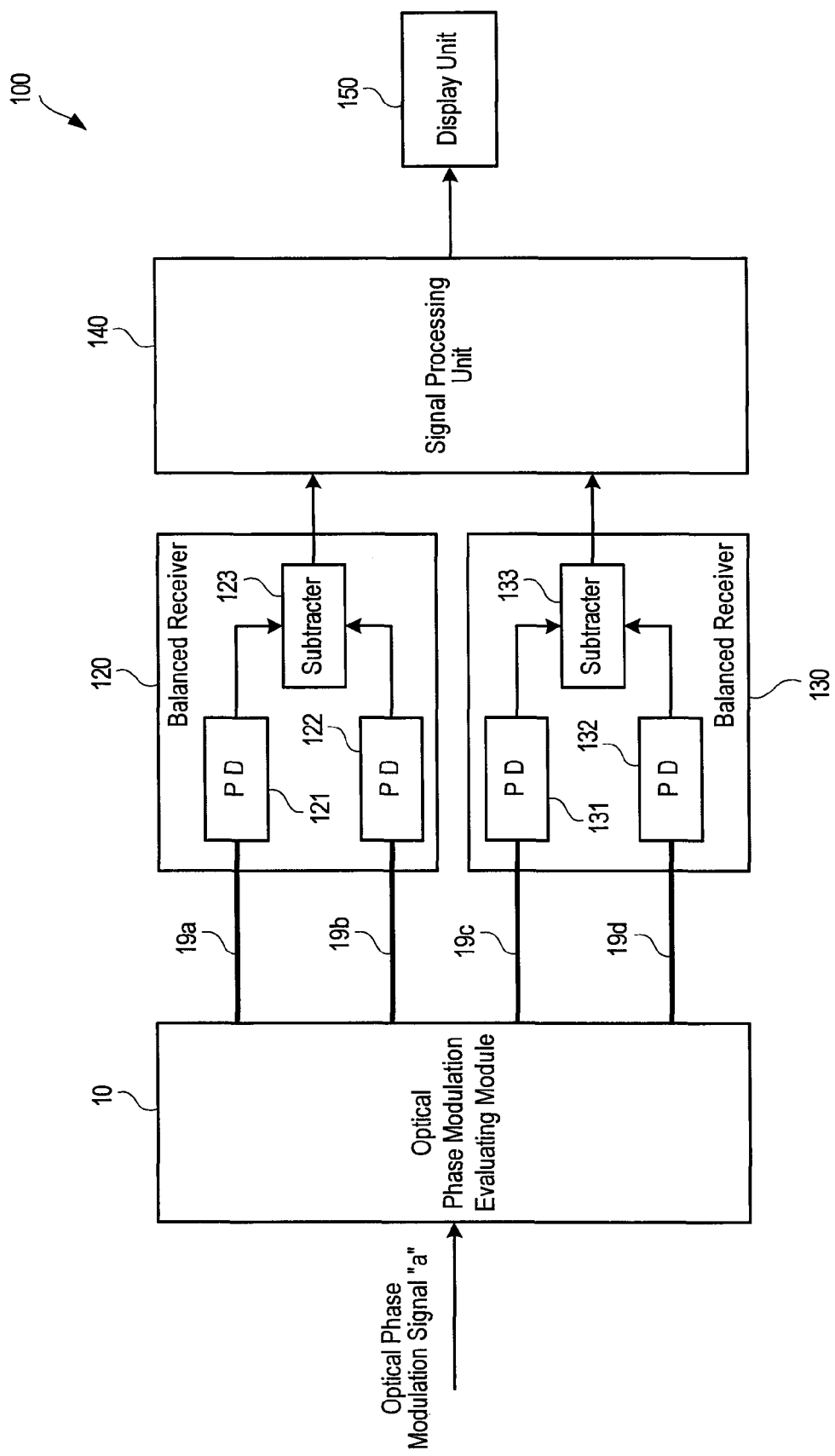
FIG. 4 is a block diagram showing an optical phase modulation evaluating device provided with the optical phase modulation evaluating module according to the present invention.

As shown in FIG. 4, the optical phase modulation evaluating device 100 comprises the above-mentioned optical phase modulation evaluating module 10, balanced receivers 120 and 130, a signal processing unit 140, and a display unit 150. The optical phase modulation evaluating module 10 is connected to the balanced receivers 120 and 130 through four optical fibers 19a, 19b, 19c, and 19d.

The balanced receiver 120 has photosensitive detectors (hereinafter simply referred to as "PD") 121 and 122 for receiving the light intensity conversion signals from the optical phase modulation evaluating module 10, and for obtaining light intensity conversion signals from the light intensity conversion signals by performing photoelectric conversion, and a subtracter 123 for receiving the light intensity conversion signals from the PD 121 and 122, and calculating the difference between the light intensity conversion signals.

The PD 121 receives the first light intensity conversion signal 111 from the first optical output unit 18a (see FIG. 1) of the optical phase modulation evaluating module 10 through the optical fiber 19a, obtains a light intensity conversion signal from the first light intensity conversion signal 111 by performing photoelectric conversion, and outputs the light intensity conversion signal to the subtracter 123. The PD 122 receives the second light intensity conversion signal 112 from the second optical output unit 18b (see FIG. 1) of the optical phase modulation evaluating module 10 through the optical fiber 19b, obtains a light intensity conversion signal from the second light intensity conversion signal 112 by performing photoelectric conversion, and outputs the light intensity conversion signal to the subtracter 123.

The subtracter 123 is adapted to output the difference between the light intensity conversion signal from the PD 121 and the light intensity conversion signal from the PD 122.

Therefore, the balanced receiver 130 is adapted to receive the light intensity conversion signals from the first Mach-Zehnder interferometer through the optical fibers 19a and 19b, and performs differential operation to output the difference between the light intensity conversion signals to the signal processing unit 140.

The balanced receiver 130 has photosensitive detectors (PD) 131 and 132 for receiving the light intensity conversion signals from the optical phase modulation evaluating module 10, and for obtaining light intensity conversion signals from the light intensity conversion signals by performing photoelectric conversion, and a subtracter 133 for receiving the light intensity conversion signals from the PD 131 and 132, and calculating the difference between the light intensity conversion signals.

The PD 131 receives the third light intensity conversion signal 113 from the third optical output unit 18c (see FIG. 1) of the optical phase modulation evaluating module 10 through the optical fiber 19c, obtains a light intensity conversion signal from the third light intensity conversion signal 113 by performing photoelectric conversion, and outputs the light intensity conversion signal to the subtracter 133. The PD 132 receives the fourth light intensity conversion signal 114 from the second optical output unit 18d (see FIG. 1) of the optical phase modulation evaluating module 10 through the optical fiber 19d, obtains a light intensity conversion signal from the fourth light intensity conversion signal 114 by performing photoelectric conversion, and outputs the light intensity conversion signal to the subtracter 133.

The subtracter 133 is adapted to output the difference between the light intensity conversion signal from the PD 131 and the light intensity conversion signal from the PD 132.

Therefore, the balanced receiver 130 is adapted to receive the light intensity conversion signals from the second Mach-Zehnder interferometer through the optical fibers 19c and 19d, and to output the difference between the light intensity conversion signals to the signal processing unit 140.

The signal processing unit 140 is adapted to calculate, on the basis of output signals from the balanced receivers 120 and 130, a phase difference "Δ φ mod" between relative bits resulting from the modulation in phase of the optical phase modulation signal "a" inputted into the optical phase modulation evaluating module 10, and to output a histogram showing a phase difference between relative bits, a constellation, a graph showing the change with time of the phase difference between relative bits, and the like.

More specifically, the signal processing unit 140 has a phase difference table (not shown) indicating a previously-measured relation between output signals from the balanced receivers 120 and 130 and a phase difference "Δ φ mod" between relative bits resulting from the modulation in phase of the optical phase modulation signal "a", a phase difference calculating means (not shown) for calculating, on the basis of the phase difference table, a phase difference "Δ φ mod" between the output signals from the balanced receivers 120 and 130, and means for calculating, on the basis of the calculated phase difference "Δ φ mod" between relative bits, a histogram showing a phase difference between relative bits, a constellation, a graph showing the change with time of the phase difference between relative bits, and the like.

The display unit 150 has, for example, a liquid crystal screen, and is adapted to display a histogram showing a phase difference between relative bits, a constellation, a graph showing the change with time of the phase difference between relative bits, and the like calculated by the signal processing unit 140.

The operation of the optical phase modulation evaluating device 100 according to the first embodiment of the present invention will then be described hereinafter.

The operation of the optical phase modulation evaluating module 10 will firstly be described hereinafter with reference to FIG. 1.

Firstly, the optical input unit 11 outputs an inputted optical phase modulation signal "a" to the optical dividing unit 12.

Then, the optical dividing unit 12 divides a light beam inputted from the optical input unit 11 into the first light beam 101 and the second light beam 102, and outputs the first light beam 101 and the second light beam 102 to the beam splitter 13a.

Then, the beam splitter 13a splits the first light beam 101 into the third light beam 103 and the fourth light beam 104, outputs the third light beam 103 to the bit delay device 15, and outputs the fourth light beam 104 to the second mirror 14b. Further, the beam splitter 13a splits the second light beam 102 into the fifth light beam 105 and the sixth light beam 106, outputs the fifth light beam 105 to the bit delay device 15, and outputs the sixth light beam 106 to the second mirror 14b.

Then, the second mirror 14b reflects the fourth light beam 104 to output the reflected light beam as a ninth light beam 109 to the light transmissive plate 16a of the optical phase difference setting device 16. The ninth light beam 109 is then inputted into the beam splitter 13b through the light transmissive plate 16a. Further, the second mirror 14b reflects the sixth light beam 106 to output the reflected light beam as a tenth light beam 110 to the light transmissive plate 16b of the optical phase difference setting device 16. The tenth light beam 110 is then inputted into the beam splitter 13b through the light transmissive plate 16b. When the ninth light beam 109 is inputted and passed through the light transmissive plate 16a, the ninth light beam 109 is delayed by the light transmissive plate 16a. When the ninth light beam 109 and the tenth light beam 110 pass through the 11th optical path and the 21th optical path, the ninth light beam 109 is delayed with respect to the tenth light beam 110 by a predetermined phase difference by the light transmissive plate 16a.

On the other hand, the third light beam 103 and the fifth light beam 105 inputted into the bit delay device 15 are delayed by one bit per second by the bit delay device 15, and outputted to the first mirror 14a.

Then, the first mirror 14a reflects the third light beam 103 delayed by the bit delay device 15 to output the reflected light beam as a seventh light beam 107 to the BS 13b. The first mirror 14a reflects the fifth light beam 105 delayed by the bit delay device 15 to output the reflected light beam as an eighth light beam 108.

Then, the BS 13b outputs a first light intensity conversion signal 111 and a second light intensity conversion signal 112 by combining the eighth light beam 108 and the tenth light beam 110 to ensure that the eighth light beam 108 interferes with the tenth light beam 110. The phase difference between the first light intensity conversion signal 111 and the second light intensity conversion signal 112 is equal to π radian. The BS 13b outputs a third light intensity conversion signal 113 and a fourth light intensity conversion signal 114 by combining the seventh light beam 107 and the ninth light beam 109 to ensure that the seventh light beam 107 interferes with the ninth light beam 109. The phase difference between the third light intensity conversion signal 113 and the fourth light intensity conversion signal 114 is equal to π radian.

Then, the first optical output unit 18a receives the first light intensity conversion signal 111 from the BS 13b, and outputs the first light intensity conversion signal 111 to an optical fiber 19a. The second optical output unit 18b receives the second light intensity conversion signal 112 from the BS 13b, and outputs the first light intensity conversion signal 112 to an optical fiber 19b. The third optical output unit 18c receives the third light intensity conversion signal 113 from the BS 13b, and outputs the third light intensity conversion signal 113 to an optical fiber 19c. The fourth optical output unit 18d receives the fourth light intensity conversion signal 114 from the BS 13b, and outputs the fourth light intensity conversion signal 114 to an optical fiber 19d.

The subsequent operation of the optical phase modulation evaluating module 10 will be then described hereinafter with reference to FIG. 4.

Firstly, in the balanced receiver 120, the PD 121 receives the first light intensity conversion signal 111 from the first optical output unit 18a (see FIG. 1) through the optical fiber 19a, obtains a light intensity conversion signal from the first light intensity conversion signal 111 by performing photoelectric conversion, and outputs the light intensity conversion signal to the subtracter 123.

Similarly, the PD 122 receives the second light intensity conversion signal 112 from the second optical output unit 18b (see FIG. 1) through the optical fiber 19b, obtains a light intensity conversion signal from the second light intensity conversion signal 112 by performing photoelectric conversion, and outputs the light intensity conversion signal to the subtracter 123.

Then, the subtracter 123 outputs, to the signal processing unit 140, the difference between the light intensity conversion signal received from the PD 121 and the light intensity conversion signal received from the PD 122.

The first and second light intensity conversion signals 111 and 112 are indicated by reference characters $P_1$ and $P_2$, and calculated according to the following expressions 10 and 11.

$$P_1 = 0.5 + 0.5 \cos(\Delta\phi\text{mod}) \tag{10}$$

$$P_2 = 0.5 - 0.5 \cos(\Delta\phi\text{mod}) \tag{11}$$

From the expressions (10) and (11), it will be understood that the output signal "P" to be outputted from the subtracter 123 is calculated according to the following expression (14). The offset power appearing in the expressions (10) and (11) is cancelled, and the light intensity is doubled by the expression (14). As a result, the light intensity "$I_\alpha$" corresponding to the output signal "P" to be outputted from the subtracter 123 is represented by a following expression (15).

$$P = P_1 + P_2 = \cos(\Delta\phi\text{mod}) \tag{14}$$

$$I_\alpha \propto \cos(\Delta\phi\text{mod}) \tag{15}$$

Then, in the balanced receiver 130, the PD 131 receives the third light intensity conversion signal 113 from the third optical output unit 18c (see FIG. 1) through the optical fiber 19c, performs the photoelectric conversion of the third light intensity conversion signal 113 to a light intensity conversion signal, and outputs the light intensity conversion signal to the subtracter 133.

Similarly, the PD 132 receives the fourth light intensity conversion signal 114 from the fourth optical output unit 18d (see FIG. 1) through the optical fiber 19d, performs the photoelectric conversion of the fourth light intensity conversion signal 114 to a light intensity conversion signal, and outputs the light intensity conversion signal to the subtracter 133.

Then, the subtracter 133 outputs, to the signal processing unit 140, the difference between the light intensity conversion signal from the PD 131 and the light intensity conversion signal from the PD 132.

Here, the third and fourth light intensity conversion signals 113 and 114 are represented by respective reference characters "$P_1$" and "$P_2$", and calculated according to the following expressions (16) and (17) under the condition the same as that described in "Problem to be solved by the Invention", by reason that the optical phase modulation evaluating device comprises an optical phase difference setting device 16 (see FIG. 1). The third and fourth light intensity conversion signals 113 and 114 are respectively represented by the following expressions (16) and (17).

$$P_1 = 0.5 + 0.5 \cos(\Delta\phi\text{mod} + \pi/2) \tag{16}$$

$$P_2 = 0.5 - 0.5 \cos(\Delta\phi\text{mod} + \pi/2) \tag{17}$$

From the expressions (16) and (17), it will be understood that the output signal "P" to be outputted from the subtracter 133 is calculated according to the following expression (18). The offset power appearing in the expressions (16) and (17) is cancelled, and the light intensity is doubled by the expression (18). As a result, the light intensity "$I_\beta$" corresponding to the output signal "P" to be outputted from the subtracter 133 is represented by a following expression (19).

$$P = P_1 - P_2 = \cos(\Delta\phi\text{mod} + \pi/2) \tag{18}$$

$$I_\beta \propto \cos(\Delta\phi\text{mod} + \pi/2) \tag{19}$$

Figure 5:
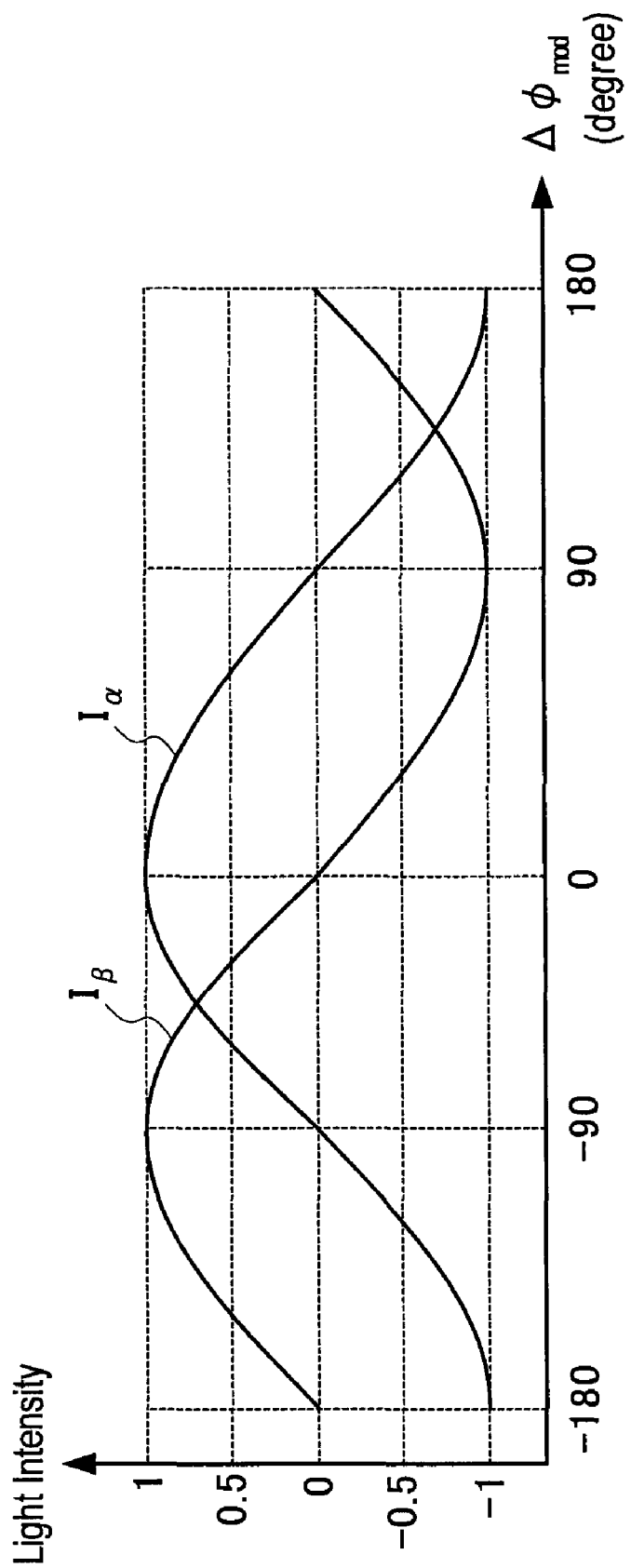
FIG. 5 is a graph showing relations between phases and light intensities Iα and Iβ of the conventional optical phase modulation evaluating module.

The light intensities "$I_\alpha$" and "$I_\beta$" are in relationship indicated in FIG. 5 with each other. In other words, the light intensity "$I_\beta$" defined by the expression (19) lags in phase by $\pi/2$ radian (90 degrees) behind the light intensity "$I_\alpha$" defined by the expression (16).

Further, the signal processing units 140 calculates a phase difference "$\Delta \phi$ mod" between relative bits on the basis of the output signals from balanced receivers 120 and 130 with reference to a phase difference table (not shown) which is previously stored in a memory medium, and indicative of the calculated relation between the phase difference "$\Delta \phi$ mod" between the optical phase modulation signal "a" and the output signals from the balanced receivers 120 and 130. Further, the signal processing units 140 calculates and outputs, to the display unit 150, a histogram showing a phase difference between relative bits, a constellation, a graph showing the change with time of the phase difference between relative bits, and the like on the basis of the phase difference "$\Delta \phi$ mod" between relative bits.

From the foregoing description, it will be understood that the signal processing units 140 can identify the phase difference "$\Delta \phi$ mod" between relative bits on the basis of the light intensities "$I_\alpha$" and "$I_\beta$", by reason that the phase difference between the light intensities "$I_\alpha$" and "$I_\beta$" is equal to $\pi/2$ radian (see FIG. 5).

Finally, the display unit 150 displays the histogram showing the phase difference between relative bits, the constellation, the graph showing the change with time of the phase difference between relative bits, and the like calculated by the signal processing unit 140.

From the foregoing description, it will be understood that the optical phase modulation evaluating module 10 according to the first embodiment of the present invention can set the optical phase difference, and evaluate the precise degree of modulation in phase of the optical phase modulation signal "a" in comparison with the conventional optical phase modulation evaluating device, by reason that the optical phase modulation evaluating module 10 is constituted by two interferometers, and outputs signals differing in optical phase by 0 radian, and signals differing in optical phase by π/2 radian at the same time, the bit delay device 15 is adapted to delay the seventh and eighth light beams 107 and 108 to be inputted into the BS 13b by one bit of the symbol rate of the optical phase modulation signal "a", the optical phase difference setting device 16 is adapted to set, to predetermined value not equal to zero, an optical phase difference between the ninth and tenth light beams 109 and 110 to be inputted to the BS 13b.

Further, the optical phase modulation evaluating device 100 according to the first embodiment of the present invention can calculate a histogram showing a phase difference between relative bits on the basis of the phase difference between relative bits of the optical phase modulation signal "a", a constellation, a graph showing the change with time of the phase difference between relative bits, and the like, and evaluate the precise degree of modulation in phase of the optical phase modulation signal "a" on the basis of the above results in comparison with the conventional optical phase modulation evaluating device, by reason that the optical phase modulation evaluating device 100 comprises an optical phase modulation evaluating module 10 for measuring the phase difference between relative bits of the optical phase modulation signal "a".

Figure 6:
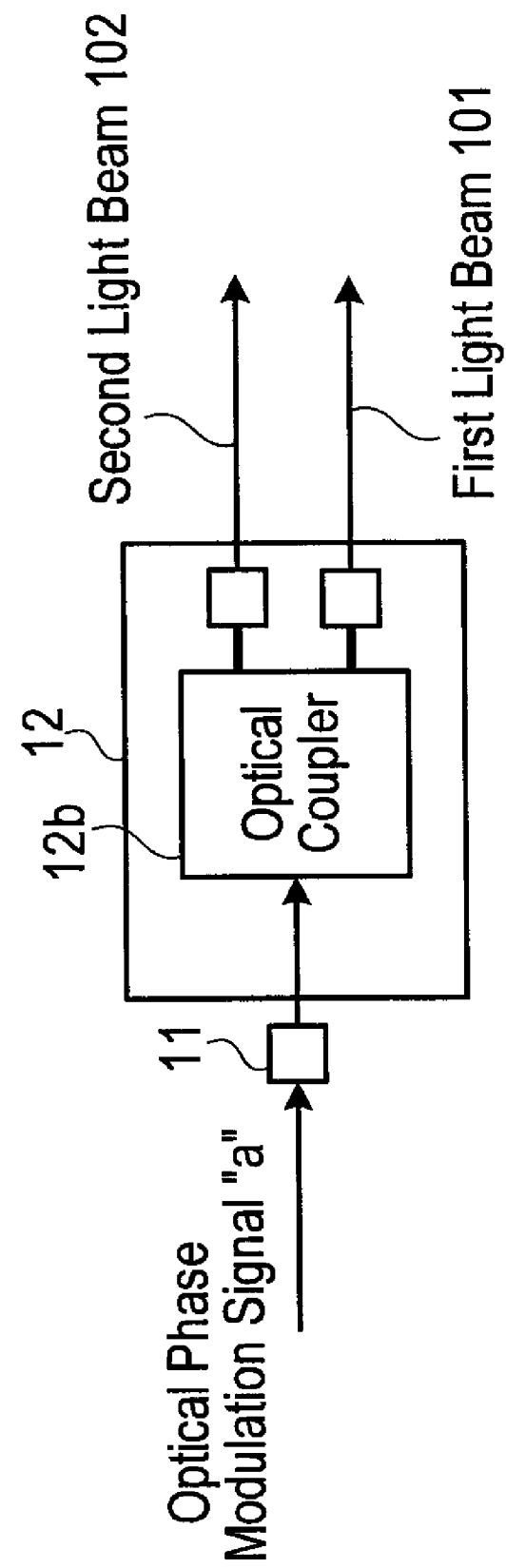
FIG. 6 is a block diagram showing another example of an optical dividing unit of the optical phase modulation evaluating module according to the first embodiment of the present invention.

Although the optical dividing unit 12 has been described in this embodiment as including mirrors, the optical dividing unit 12 may attain the same effects by including for example an optical coupler 12b as shown in FIG. 6 in place of mirrors.

In this embodiment, the bit delay device 15 is located on the optical path of the third light beam 103 and the optical path of the fifth light beam 105. The optical phase difference setting device 16 is located on the optical path of the ninth light beam 109 and the optical path of the tenth light beam 110. However, the present invention is not limited by the above-mentioned positions.

More specifically, the bit delay device 15 may be located on the optical path of the fourth light beam 104 and the optical path of the sixth light beam 106, the optical path of the seventh light beam 107 and the optical path of the eighth light beam 108, or the optical path of the ninth light beam 109 and the optical path of the tenth light beam 110 in place of the optical path of the third light beam 103 and the optical path of the fifth light beam 105.

The optical phase difference setting device 16 may be located on the optical path of the third light beam 103 and the optical path of the fifth light beam 105, the optical path of the fourth light beam 104 and the optical path of the sixth light beam 106, or the optical path of the seventh light beam 107 and the optical path of the eighth light beam 108 in place of the optical path of the ninth light beam 109 and the optical path of the tenth light beam 110.

(Second Embodiment)

The second embodiment of the optical phase modulation evaluating device according to the present invention will then be described hereinafter.

Figure 7:
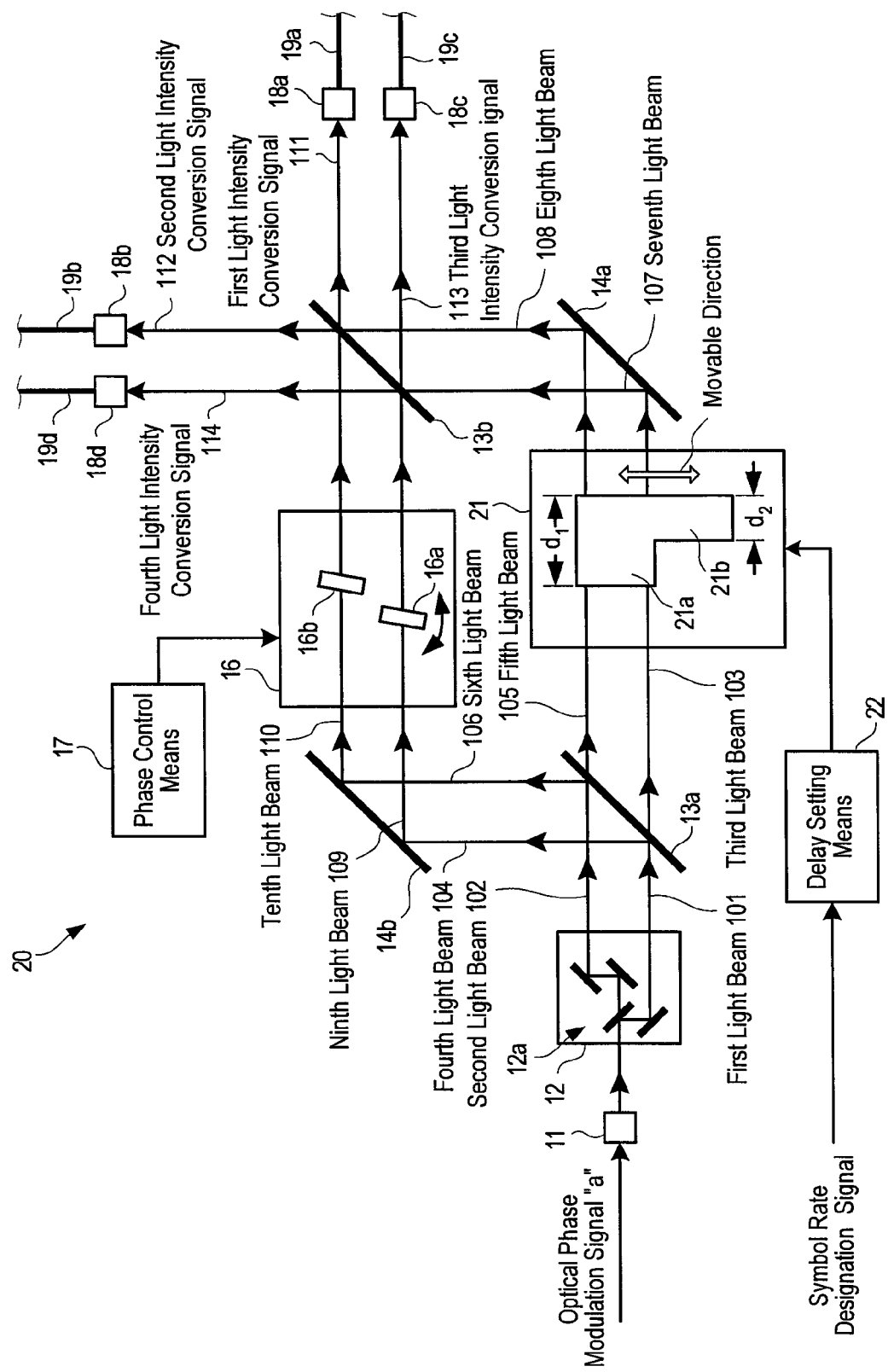
FIG. 7 is a block diagram showing the construction of an optical phase modulation evaluating module according to the second embodiment of the present invention.

As shown in FIG. 7, the optical phase modulation evaluating module 20 of the optical phase modulation evaluating device according to the second embodiment is the same in construction as the optical phase modulation evaluating module 10 (see FIG. 1) according to the first embodiment with the exception that the optical phase modulation evaluating module 20 includes a bit delay device 21 in place of the bit delay device 15, and further includes delay setting means 22. The constitutional units of the optical phase modulation evaluating module 20 the same as those of the optical phase modulation evaluating module will not be described hereinafter and bear the same reference characters as those of the optical phase modulation evaluating module 10.

The bit delay device 21 has a retainer (not shown) and light transmissive plates 21a and 21b retained by the retainer. The light transmissive plates 21a and 21b are movable in the direction of arrows shown in FIG. 7, and selectively employed in response to the optical path length necessary to attain the delay of one bit with respect to the symbol rate of the optical phase modulation signal "a".

The delay setting means 22 is adapted to output, to the bit delay device 21, a signal indicative of an instruction to change from one of the optical paths of the light transmissive plates 21a and 21b in response to the symbol rate designating setting signal.

The light transmissive plates 21a and 21b are constituted by parallel plates made of, for example, silica glass. When the light transmissive plate 21a is 1.5 in refraction index, and 30 mm in thickness, the light transmissive plate 21a is employed to delay optical phase modulation signal "a" defined as a signal modulated in phase by a data signal at a symbol rate of 20 Gbps.

Although the bit delay device 21 includes light transmissive plates shown in FIG. 7 in the second embodiment, the bit delay device 21 may attain the same effects by including, for example, members shown in FIGS. 8a and 8b or the like in place of light transmissive plates shown in FIG. 7.

The bit delay device 23 shown in FIG. 8(a) has a pair of light transmissive plates (23a1 and 23a2) constituted by parallel plates made of the same material, inclined with respect to each other, and located under the condition that the incidence angles of the third and fifth light beams 103 and 105 to the light transmissive plate 23a1 are equal to the output angles of the third and fifth light beams 103 and 105 to the light transmissive plate 23a2, and a pair of light transmissive plates (23b1 and 23b2) constituted by parallel plates made of the same material, inclined with respect to each other, and located under the condition that the incidence angles of the third and fifth light beams 103 and 105 to the light transmissive plate 23a1 are equal to the output angles of the third and fifth light beams 103 and 105 to the light transmissive plate 23a2. The light transmissive plates (23a1 and 23a2) are employed for SR=20 [Gbps]. On the other hand, the light transmissive plates (23b1 and 23b2) are smaller in thickness than the light transmissive plates (23a1 and 23a2), and employed for SR=40 [Gbps]. Therefore, the bit delay device 23 shown in FIG. 8(a) can selectively switch between two optical lengths corresponding to the symbol rates by reason that the bit delay device 23 is movable in the direction of arrows shown in FIG. 8(a).

The bit delay device 24 shown in FIG. 8(b) has a retaining unit (not shown), a light transmissive member 24a fixed by the retaining unit, and a light transmissive member 24b movable with respect to the light transmissive member 24a in the direction of arrows shown in FIG. 8(b). The light transmissive members 24a and 24b have the shape in cross section of a triangle (wedge) as will be seen from FIG. 8(b). Therefore, the bit delay device 23 shown in FIG. 8(b) can selectively switch two optical lengths corresponding to the symbol rates by reason that the light transmissive member 24b is movable with respect to the light transmissive member 24a in the direction of arrows shown in FIG. 8(b).

Additionally, the light transmissive members 24a and 24b may be movable with respect to each other. In FIG. 8(b), the incidence angles of the third and fifth light beams 103 and 105 to the light transmissive plate 24a1 and the output angles of the third and fifth light beams 103 and 105 to the light transmissive plate 24a2 are equal to zero. On the other hand, the incidence angles of the third and fifth light beams 103 and 105 to the light transmissive plate 24a1 and the output angles of the third and fifth light beams 103 and 105 to the light transmissive plate 24a2 may be set to a value different from zero. In this case, the reflection from an input surface can be reduced.

From the foregoing description, it will be understood that the optical phase modulation evaluating device 20 according to the second embodiment can selectively switch between two optical path lengths corresponding to the delay time of one bit with respect to the symbol rates, by reason that the bit delay device 21 includes a pair of light transmissive plates (21a and 21b) different in thickness from each other.

Although the bit delay device 21 for the symbol rates of 20[Gbps] and 40[Gbps] is exemplified above, the present invention is not limited by the above-mentioned construction. The bit delay device 21 may attain the same effects by including, for example, three pairs of light transmissive plates corresponding to three symbol rates.

(Third Embodiment)

The third embodiment of the optical phase modulation evaluating device according to the present invention will then be described hereinafter.

Figure 9:
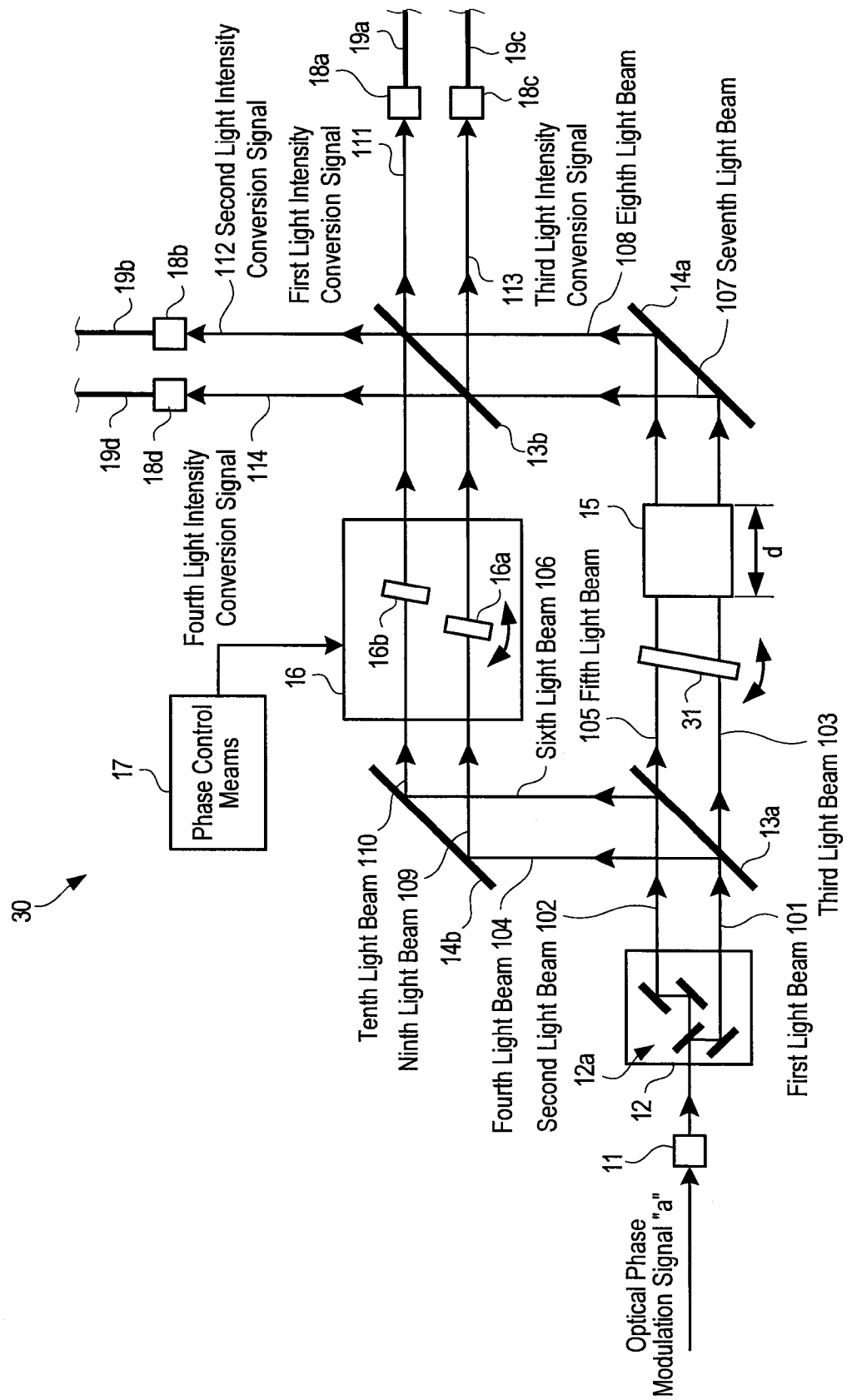
FIG. 9 is a block diagram showing the construction of an optical phase modulation evaluating module according to the third embodiment of the present invention.

As shown in FIG. 9, the optical phase modulation evaluating module 30 of the optical phase modulation evaluating device according to the third embodiment is the same in construction as the optical phase modulation evaluating module 10 (see FIG. 1) according to the first embodiment with the exception that the optical phase modulation evaluating module 30 further includes a delay unit 31 for adjusting a phase difference between signals. The constitutional units of the optical phase modulation evaluating module 30 the same as those of the optical phase modulation evaluating module 10 will not be described hereinafter and bear the same reference characters as those of the optical phase modulation evaluating module 10.

The delay unit 31 for adjusting a phase difference between signals has a parallel plate which is uniform in electric permittivity, and constituted by for example a silica glass plate. The delay unit 31 is located on the optical path of the third and fifth light beams 103 and 105, pivotally movable in the direction of an arrow shown in FIG. 9, and can adjust the length of the optical path of the third and fifth light beams 103 and 105. In the third embodiment of the present invention, the delay unit 31 corresponds to the optical phase difference adjusting means.

When the delay unit 31 is pivotally moved in the direction of an arrow shown in FIG. 9, the delay unit 31 changes the length of the optical path of the third and fifth light beams 103 and 105. As a result, the delay unit 31 can change the light intensity corresponding to the phase differences between relative bits "Δϕmod" of the light intensity conversion signals to be outputted from the first to fourth light beam output units 18a to 18d. Therefore, the delay unit 31 adjusted in delay can correct an initial value (ϕ) of the phase difference between relative bits calculated from the light intensities of the light intensity conversion signals.

Additionally, the delay unit 31 for adjusting a phase difference may be different in constriction from the delay device described with reference to FIG. 9. For example, the delay unit 31 may have a pair of light transmissive plates the same in construction as the light transmissive plates 16e and 16f of the optical phase difference setting device 16 described with reference to FIG. 3. The light transmissive plates are pivotally movable around their axis. The light transmissive plates are inclined with respect to each other under the condition that the input angles of the third and fifth light beams 103 and 105 to one of the light transmissive plates are equal to the output angles of the third and fifth light beams 103 and 105 to the other of the light transmissive plates.

The optical phase modulation evaluating module 30 thus constructed as previously mentioned can easily adjust the optical phases of the light intensity conversion signals to be inputted into the balanced receivers 120 and 130 by monitoring photoelectric conversion signals outputted from the PDs 121, 122, 131, and 132 in place of the optical phase modulation evaluating module 10 shown in FIG. 4.

In the optical phase modulation evaluating module 30 according to the third embodiment of the present invention, the delay unit 31 has a light transmissive plate which is pivotally movable around its axis. The third and fifth light beams 103 and 105 are passed through the light transmissive plate. Therefore, the delay unit 31 can adjust the light intensity associated with the phase differences between relative bits "Δϕmod" of the light intensity conversion signals to be outputted from the first to fourth light beam output units 18a to 18d, and correct the phase differences between relative bits "Δϕmod" on the basis of the light intensity of the phase differences between relative bits "Δϕmod".

Although the optical phase modulation evaluating module 30 according to the third embodiment of the present invention includes delay unit 31 located on the optical paths of the third and fifth light beams 103 and 105, the delay unit 31 may be located on the optical path from the BS 13a to the BS 13b through the first mirror 14a, or a delay unit 31 located on the optical path from the BS 13a to the BS 13b through the second mirror 14b.

(Fourth Embodiment)

The fourth embodiment of the optical phase modulation evaluating device according to the present invention will then be described hereinafter.

Figure 10:
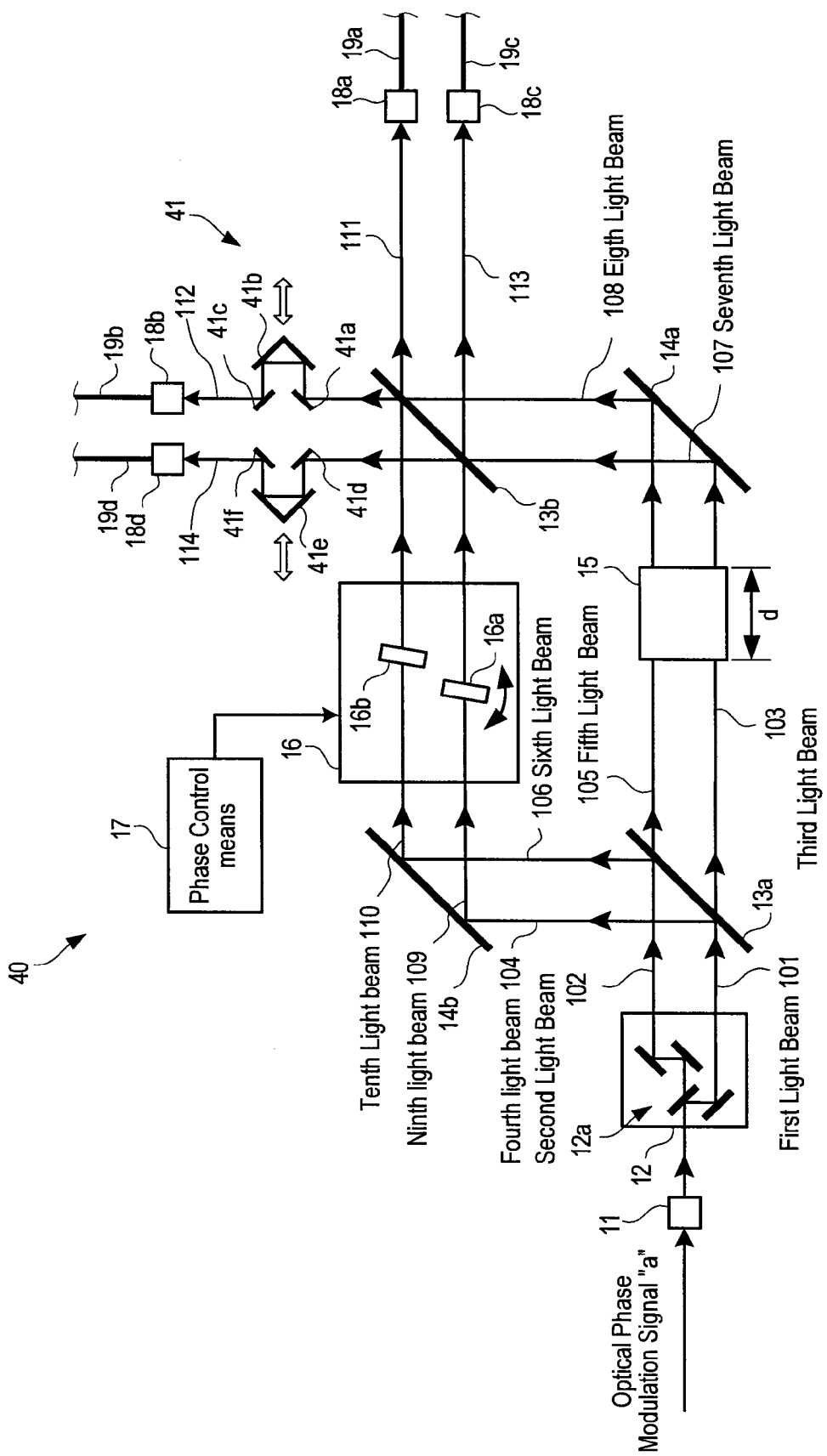
FIG. 10 is a block diagram showing the construction of an optical phase modulation evaluating module according to the fourth embodiment of the present invention.

As shown in FIG. 10, the optical phase modulation evaluating module 40 of the optical phase modulation evaluating device according to the third embodiment is the same in construction as the optical phase modulation evaluating module 10 (see FIG. 1) according to the first embodiment with the exception that the optical phase modulation evaluating module 40 further includes a phase adjuster 41. The constitutional units of the optical phase modulation evaluating module 40 the same as those of the optical phase modulation evaluating module 10 will not be described hereinafter and bear the same reference characters as those of the optical phase modulation evaluating module 10.

The phase adjuster 41 is employed to adjust phases of photoelectric conversion signals to be generated in the balanced receivers 120 and 130 (see FIG. 4). As shown in FIG. 10, the phase adjuster 41 has a mirror 41a located on the optical path of the second light intensity conversion signal 112, a corner mirror 41b, a mirror 41c, a mirror 41d located on the optical path of the fourth light intensity conversion signal 114, a corner mirror 41e, and a mirror 41f. The corner mirrors 41b and 41e retained by retaining means (not shown) are separately movable in the direction of arrows shown in FIG. 10. Here, the phase adjuster 41 functions as light length adjusting means.

The phase adjuster 41 thus constructed can change separately an optical path of the second light intensity conversion signal 112, and an optical path of the fourth light intensity conversion signal 114.

In FIG. 10, it is preferable that the optical path (111, 18a, and 19a) to the PD 121 from the BS 13b (see FIG. 4) is substantially equal in length to the optical path (112, 18b, 19b) to the PD 122 from the BS 13b (see FIG. 4) under the condition that the corner mirror 41b occupies an initial position, and it is preferable that the optical path (113, 18c, and 19c) to the PD 131 from the BS 13b (see FIG. 4) is substantially equal in length to the optical path (114, 18d, 19d) to the PD 132 from the BS 13b (see FIG. 4) under the condition that the corner mirror 41b occupies an initial position.

The optical phase modulation evaluating module 40 thus constructed as previously mentioned is employed in place of the optical phase modulation evaluating module 10 shown in FIG. 4, and can adjust the phase difference between the light intensity conversion signals to be inputted into the balanced receivers 120 and 130 to π radian (180 degrees).

Even if, for example, the photoelectric conversion signals from the photoelectric detectors 121 and 122 are slightly different in phase from predetermined values as a result of the fact that the optical fibers 19a and 19b are slightly different in length from each other, the phase adjuster 41 can conform the phases of the photoelectric conversion signals to the predetermined values.

From the foregoing description, it will be understood that the optical phase modulation evaluating module 40 can adjust the phase difference between the light intensity conversion signals to be received by the balanced receivers 120 and 130, by reason that the optical path for the second light intensity conversion signal 112 and the optical path for the fourth light intensity conversion signal 114 are separately changed in the phase adjuster 41.

Additionally, the optical phase modulation evaluating module 40 according to the sixth embodiment of the present invention comprises a phase adjuster 41 located on the optical paths of the second and fourth light conversion signals 112 and 114. However, the optical phase modulation evaluating module 40 can attain the same effect by comprising a phase adjuster 41 located on the optical paths from the BS 13b to the balanced receiver 120 or 130.

The phase adjuster is not limited by the phase adjuster 41 shown in FIG. 10. For example, two light transmissive plates may be located on respective optical paths of the second and fourth light intensity conversion signals 112 and 114, and movable around their axis in order to change the optical path lengths.

(Fifth Embodiment)

The fifth embodiment of the optical phase modulation evaluating device according to the present invention will then be described hereinafter. The constitutional units of the optical phase modulation evaluating module according to the fifth embodiment the same as those of the optical phase modulation evaluating module 10 (see FIG. 1) according to the first embodiment will not be described and bear the same reference characters as those of the optical phase modulation evaluating module 10.

Figure 11:
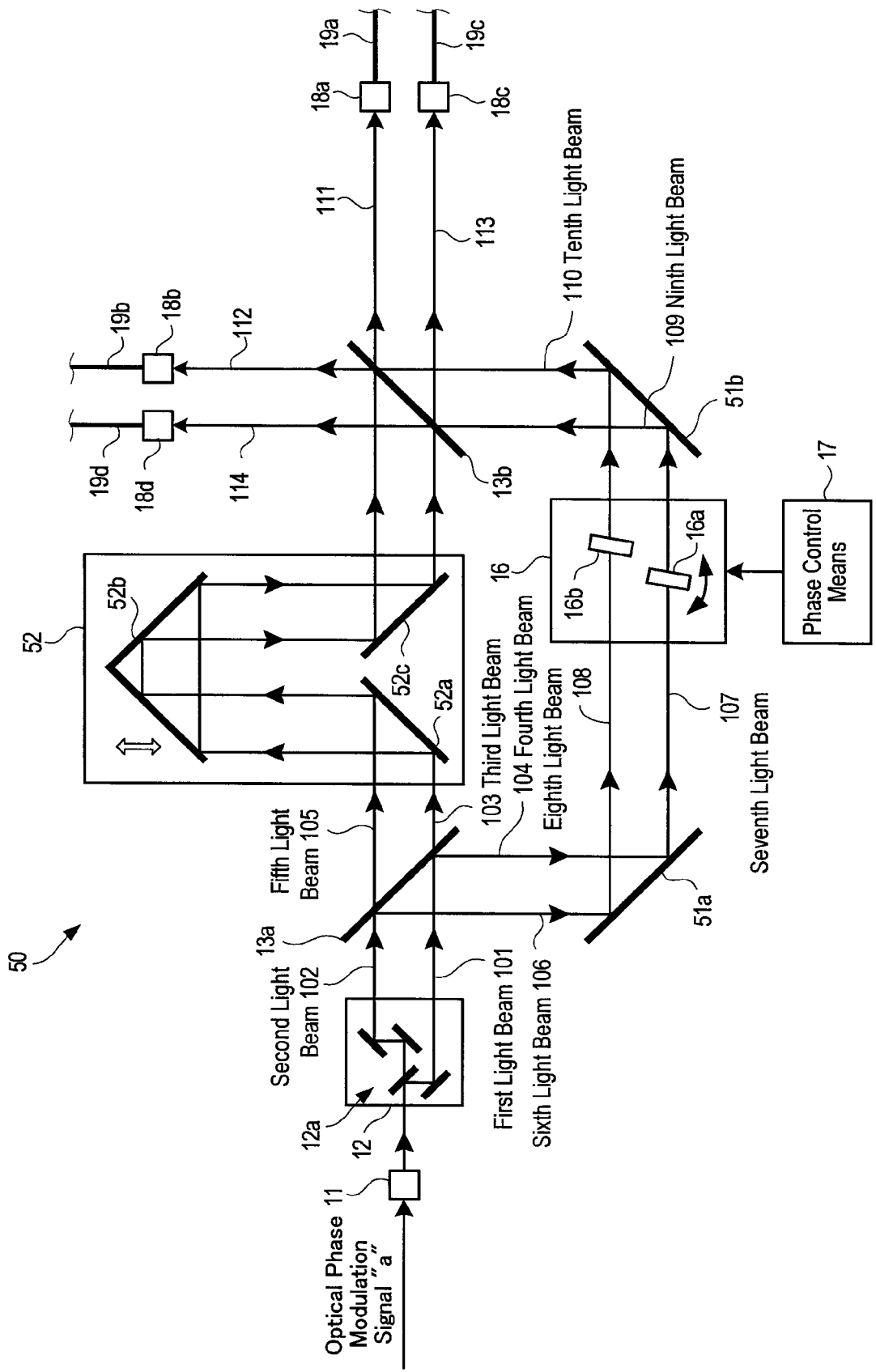
FIG. 11 is a block diagram showing the construction of an optical phase modulation evaluating module according to the fifth embodiment of the present invention.

As shown in FIG. 11, the optical phase modulation evaluating module 50 includes an optical input unit 11 for inputting an optical phase modulation signal "a", an optical dividing unit 12 for dividing the inputted optical phase modulation signal "a" into the first light beam 101 and the second light beam 102, a beam splitter (hereinafter simply referred to as "BS") 13a for splitting the first light beam 101 into the third light beam 103 and the fourth light beam 104, and splitting the second light beam 102 into the fifth light beam 105 and the sixth light beam 106, a first mirror 51a for reflecting the fourth light beam 104 to output a reflected light beam as the seventh light beam 107, and reflecting the sixth light beam 106 to output a reflected light beam as the eighth light beam 108, and a second mirror 51b for reflecting the seventh light beam 107 to output a reflected light beam as the ninth light beam 109, and reflecting the eighth light beam 108 to output a reflected light beam as the tenth light beam 110.

The optical phase modulation evaluating module 50 further includes a beam splitter (hereinafter simply referred to as "BS") 13b for combining the fifth light beam 105 with the tenth light beam 110 to synthesize a first light intensity conversion signal 111 and a second light intensity conversion signal 112 differing in phase by π radian from the first light intensity conversion signal 111, and combining the third light beam 103 with the ninth light beam 109 to synthesize a third light intensity conversion signal 113 and a fourth light intensity conversion signal 114 differing in phase by π radian from the third light intensity conversion signal 113, the change in phase of the optical phase modulation signal "a" being converted to the change in light intensity of the first and second light intensity conversion signals 111 and 112 and the change in light intensity of the third and fourth light intensity conversion signals 113 and 114 by the synthesizer 13b, a bit delay device 52 for changing the length of the optical path to delay the signals by one bit per second, an optical phase difference setting device 16 for setting an optical phase difference, and a phase control means 17 for instructing the optical phase difference setting device 16 to set the designated optical phase difference.

The optical phase modulation evaluating module 50 further includes a first optical output unit 18a for outputting the first light intensity conversion signal 111 to the optical fiber 19a, a second optical output unit 18b for outputting the second light intensity conversion signal 112 to the optical fiber 19b, a third optical output unit 18c for outputting the third light intensity conversion signal 113 to the optical fiber 19c, and a fourth optical output unit 18d for outputting the fourth light intensity conversion signal 114 to the optical fiber 19d.

The optical phase modulation evaluating module 50 is constituted by two Mach-Zehnder interferometers.

The first Mach-Zehnder interferometer is provided with an optical path to the first optical output unit 18a from the optical input unit 11 through the optical dividing unit 12, the BS 13a, the first mirror 51a, the second mirror 51b, and the BS 13b (hereinafter referred to as "31th optical path"), and an optical path to the second optical output unit 18b from the optical input unit 11 through the optical dividing unit 12, the BS 13a, and the BS 13b (hereinafter referred to as "32th optical path").

The second Mach-Zehnder interferometer is provided with an optical path to the third optical output unit 18c from the optical input unit 11 through the optical dividing unit 12, the BS 13a, the first mirror 51a, the second mirror 51b, and the BS 13b (hereinafter referred to as "41th optical path"), and an optical path to the fourth optical output unit 18d from the optical input unit 11 through the optical dividing unit 12, the BS 13a, and the BS 13b (hereinafter referred to as "42th optical path").

In this embodiment, the optical input unit 11, the optical dividing unit 12, the BS 13a, and the first to fourth optical output units 18a to 18d are the same as those of the optical phase modulation evaluating module 10 according to the first embodiment (see FIG. 1), and will not be described hereinafter.

The first mirror 51a is adapted to reflect the fourth light beam 104 from the BS 13a to output a reflected light beam as the seventh light beam 107 to the optical phase difference setting device 16, and adapted to reflect the sixth light beam 106 from the BS 13a to output a reflected light beam as the eighth light beam 108 to the optical phase difference setting device 16.

The second mirror 51b is adapted to reflect the seventh light beam 107 passed through the optical phase difference setting device 16 to output a reflected light beam as the ninth light beam 109 to the BS 13b, and adapted to reflect the eighth light beam 108 passed through the optical phase difference setting device 16 to output a reflected light beam as the tenth light beam 110 to the BS 13b.

On the other hand, the BS 13b is adapted to combine the third and fifth light beams 103 and 105 passed through the bit delay device 52 and the ninth and tenth light beams 109 and 110.

As shown in FIG. 11, the bit delay device 52 is constituted by mirrors, and adapted to add, to two optical paths of each of the first and second Mach-Zehnder interferometers, the optical path difference corresponding to the delay time of one bit with respect to the symbol rate of the optical phase modulation signal "a". In this embodiment, the bit delay device 52 includes an input mirror 52a, a corner mirror 52b retained by a retaining means (not shown), and an output mirror 52c. The corner mirror 52b retained by the retaining means is movable in parallel with respect to the mirrors 52a and 52c by, for example, a motor in the direction of arrows shown in FIG. 11.

More specifically, the optical path between the BS 13a and the first mirror 51a is equal in length to the optical path between the BS 13b and the second mirror 51b in this embodiment. The corner mirror 52b occupies an initial position (point of origin) under the condition that the optical path to the input mirror 52a from the corner mirror 52b is substantially equal in length to the optical path from corner mirror 52b to the output mirror 51c.

From the foregoing description, it will be understood that the optical phase modulation evaluating device 50 can set an optical path difference corresponding to the symbol rate of the optical phase modulation signal "a", by reason that the optical path difference between arms of each of the first and second Mach-Zehnder interferometers is set when the position of the corner mirror 52b is adjusted in the bit delay device 52.

Here, the optical path difference "d" of one bit with respect to the symbol rate "SR" is caused by the bit delay device 52, and calculated from a following expression (20). The reference characters "t", "n", and "c" are intended to indicate delay time, refraction index in space, and speed of light in vacuum.

$$d=c \times t/n \quad (20)$$

The delay "t" of one bit with respect to the symbol rate "SR" of the optical phase modulation signal "a" to be inputted into the light input unit 11 is calculated from t=1/SR. When SR=40 [Gbps], t=25 [ps]. When SR=20 [Gbps], t=50 [ps]. Therefore, the optical path differences "d" corresponding to the delay times "t"=25 [ps] and "t"=50 [ps] are calculated from a following expression (20), and as follows.

When SR=40 [Gbps], d=7.5 [mm]. When SR=20 [Gbps], d=15 [mm].

As explained above, the bit delay device 52 is adapted to add, to two optical paths of each of the first and second Mach-Zehnder interferometers, the optical path difference corresponding to the delay time of one bit with respect to the symbol rate of the optical phase modulation signal "a".

The optical phase difference setting device 16 includes a light transmissive plate 16a located on the optical path of the seventh light beam 107 and a light transmissive plate 16b located on the optical path of the eighth light beam 108. The optical phase difference setting device 16 is adapted to set, to π/2 radian, the difference "Δφ1−Δφ2" between the phase difference "Δφ1" between light beams corresponding to the thirty-first and thirty-second optical paths and the phase difference "Δφ2" between light beams of the forty-first and forty-second optical paths in response to an instruction from the phase control means 17. The seventh and eighth light beams 107 and 108 pass through the light transmissive plates 16a and 16b the same in refractive index as each other, and respectively constituted by parallel plates made of, for example, silica glass. Further, the light transmissive plates 16a and 16b may be the same in thickness as each other, or may be different in thickness from each other. The optical phase difference setting device 16 may be constituted by either the light transmissive plate 16a or the light transmissive plate 16b to set π/2 radian, the difference "Δφ1−Δφ2" between the phase difference "Δφ1" between light beams corresponding to the thirty-first and thirty-second optical paths and the phase difference "Δφ2" between light beams of the forty-first and forty-second optical paths.

The optical path length of the seventh light beam 107 can be changed by reason that the light transmissive plate 16a is pivotally movable around its axis in the direction of arrows shown in FIG. 11. On the other hand, the eighth light beam 108 enters the light transmissive plate 16b at the fixed incidence angle.

The BS 13b is constituted by a non-polarization beam splitter, and adapted to combine the fifth light beam 105 and the tenth light beam 110 to synthesize the first light intensity conversion signal 111 and the second light intensity conversion signal 112 differing by π radian from the first light intensity conversion signal 111, and to combine the third light beam 103 and the ninth light beam 109 to synthesize the third light intensity conversion signal 113 and the fourth light intensity conversion signal 114 differing by π radian from the third light intensity conversion signal 113.

Figure 12:
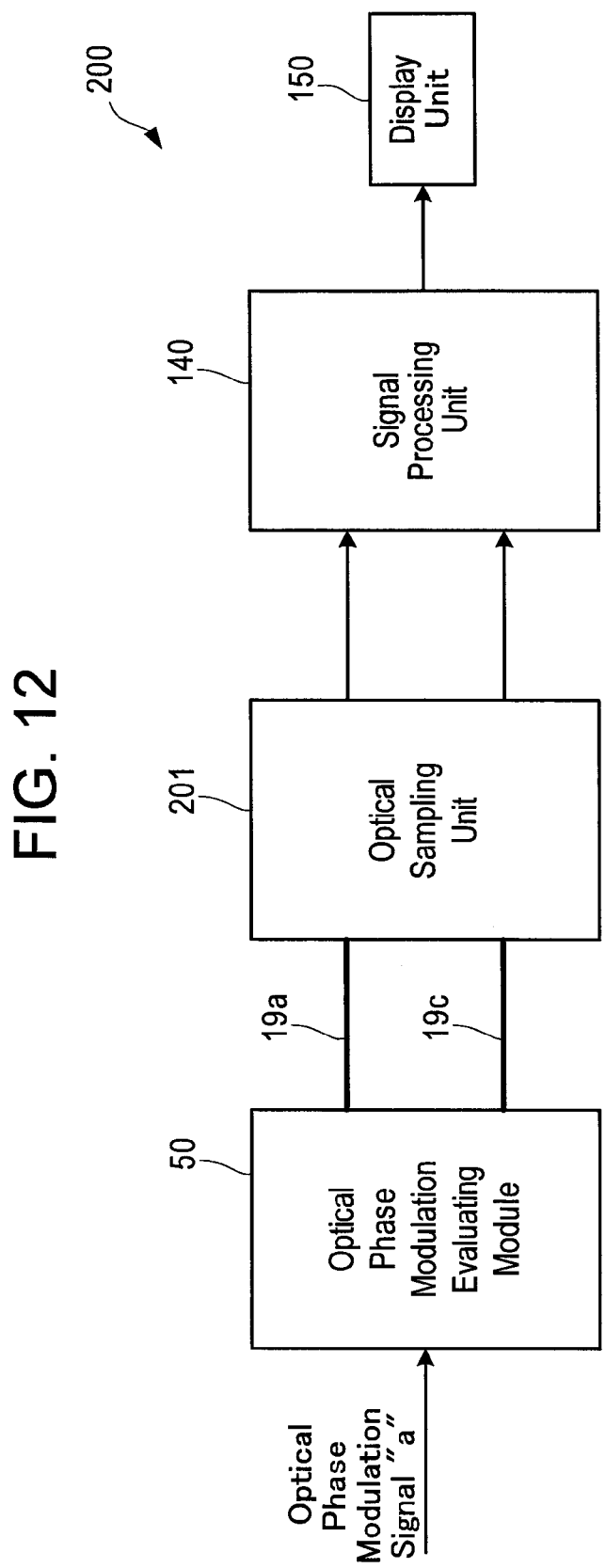
FIG. 12 is a block diagram showing an optical phase modulation evaluating device provided with the optical phase modulation evaluating module according to the present invention.

In the optical phase modulation evaluating device 100 according to the first embodiment, if the response of the photoelectric detector (PD) is relatively low, the optical phase modulation evaluating device 100 may be replaced by the optical phase modulation evaluating device 200 shown in FIG. 12. The constitutional units of the optical phase modulation evaluating device 200 the same as those of the optical phase modulation evaluating device 100 bear the same reference characters as those of the optical phase modulation evaluating device 100.

Additionally, the optical phase modulation evaluating device 200 may include a photosensitive detector (PD) improved in response characteristics as shown in FIG. 12, and may be employed in place of the optical phase modulation evaluating device 100 according to the first embodiment. The constitutional units of the optical phase modulation evaluating device 200 the same as those of the optical phase modulation evaluating device 100 according to the first embodiment will not be described hereinafter and bear the same reference characters as those of the optical phase modulation evaluating device 100 according to the first embodiment.

The optical phase modulation evaluating device 200 includes an optical phase modulation evaluating module 50, an optical sampling unit 201, a signal processing unit 140, and a display unit 150. The optical phase modulation evaluating module 50 is connected to the optical sampling unit 201 through two optical fibers 19a and 19b.

The optical sampling unit 201 includes for example nonlinear optical material, optical filters, light receiving elements and the like, and is adapted to sample light beams received from the optical phase modulation evaluating module 50 through the optical fibers 19a and 19b by using the nonlinear optical effect.

The optical phase modulation evaluating device 200 thus constructed as previously mentioned can convert the sampled optical signals to electric signals on the basis of the nonlinear optical effect, and measure a phase difference "Δφmod" between relative bits from the electric signals.

From the foregoing description, it will be understood that the optical phase modulation evaluating device 50 comprises two optical interferometers, the bit delay device 52 can adjust the difference between the arms of each of the optical interferometers to the delay of one bit with respect to the symbol rate, and the optical phase difference setting device 16 can allows the optical interferometers to output signals differing in phase by π/2 radian from each other. As a result, the optical phase modulation evaluating module 50 can detect the signal intensities of orthogonal components, make it easy to measure the phases, and set an optical phase difference corresponding to an arbitrary wavelength. Therefore, the optical phase modulation evaluating module 50 can evaluate the precise degree of modulation in phase of an optical phase modulation signal in comparison with the conventional optical phase modulation evaluating device.

As an example, the optical phase modulation evaluating module 50 may be applied to the optical phase modulation evaluating device 100 (see FIG. 4). In this case, the optical phase modulation evaluating device can calculate a histogram showing a phase difference between relative bits, a constellation, a graph showing the change with time of the phase difference between relative bits, and the like.

Further, the optical phase modulation evaluating device 200 (see FIG. 12) provided with an optical phase modulation evaluating module 50 can conduct rapid evaluations of the degree of modulation in phase of the optical phase modulation signal "a" from the optical signals sampled on the basis of the nonlinear optical effect by including the optical phase modulation evaluating module 50.

(Sixth Embodiment)

The sixth embodiment of the optical phase modulation evaluating device according to the present invention will then be described hereinafter.

Figure 13:
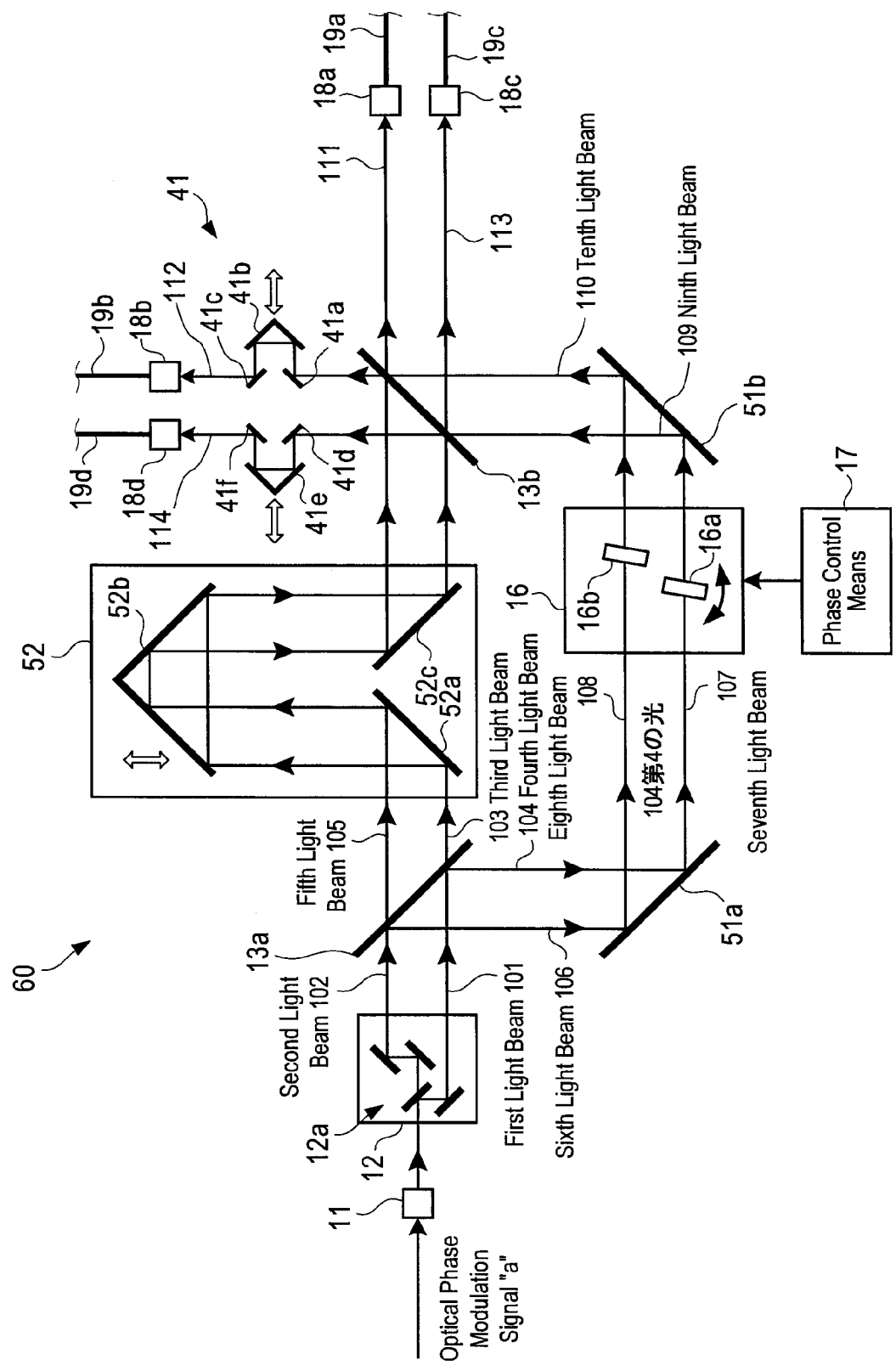
FIG. 13 is a block diagram showing the construction of an optical phase modulation evaluating module according to the sixth embodiment of the present invention.

As shown in FIG. 13, constitutional units of an optical phase modulation evaluating module 60 included in the optical phase modulation evaluating device according to the sixth embodiment is the same in construction as those of the optical phase modulation evaluating module 50 according to the fifth embodiment (see FIG. 11) with the exception that the optical phase modulation evaluating module 60 further comprises a phase adjuster 41 the same as that of the optical phase modulation evaluating module 40 according to the fourth embodiment (see FIG. 10). The constitutional units of the optical phase modulation evaluating module 60 the same as those of the optical phase modulation evaluating module 50 will not be described hereinafter and bear the same reference characters as those of the optical phase modulation evaluating module 50.

The phase adjuster 41 is employed to adjust phases of photoelectric conversion signals to be generated in the balanced receivers 120 and 130 (see FIG. 4). As shown in FIG. 13, the phase adjuster 41 has a mirror 41a located on the optical path of the second light intensity conversion signal 112, a corner mirror 41b, a mirror 41c, a mirror 41d located on the optical path of the fourth light intensity conversion signal 114, a corner mirror 41e, and a mirror 41f. The corner mirrors 41b and 41e retained by respective retaining means (not shown) are separately movable in the direction of arrows shown in FIG. 13.

The phase adjuster 41 thus constructed can change separately an optical path of the second light intensity conversion signal 112, and an optical path of the fourth light intensity conversion signal 114.

In FIG. 10, it is preferable that the optical path (111, 18a, and 19a) to the PD 121 from the BS 13b (see FIG. 4) is substantially equal in length to the optical path (112, 18b, 19b) to the PD 122 from the BS 13b (see FIG. 4) under the condition that the corner mirror 41b occupies an initial position, and it is preferable that the optical path (113, 18c, and 19c) to the PD 131 from the BS 13b (see FIG. 4) is substantially equal in length to the optical path (114, 18d, 19d) to the PD 132 from the BS 13b (see FIG. 4) under the condition that the corner mirror 41b occupies an initial position.

The optical phase modulation evaluating module 60 thus constructed as previously mentioned is employed in place of the optical phase modulation evaluating module 10 shown in FIG. 4, and can adjust the phase difference between the light intensity conversion signals to be inputted into the balanced receivers 120 and 130 to π radian.

Even if, for example, the photoelectric conversion signals from the photoelectric detectors 121 and 122 are slightly different in phase from predetermined values as a result of the fact that the optical fibers 19a and 19b are slightly different in length from each other, the phase adjuster 41 can conform the phases of the photoelectric conversion signals to the predetermined values.

From the foregoing description, it will be understood that the optical phase modulation evaluating module 60 can adjust the phase difference between the light intensity conversion signals to be received by the balanced receivers 120 and 130, by reason that the optical path for the second light intensity conversion signal 112 and the optical path for the fourth light intensity conversion signal 114 are separately changed in the phase adjuster 41.

Additionally, the optical phase modulation evaluating module 60 according to the sixth embodiment of the present invention comprises a phase adjuster 41 located on the optical paths of the second and fourth light conversion signals 112 and 114. However, the optical phase modulation evaluating module 60 can attain the same effect by comprising a phase adjuster 41 located on the optical paths from the BS 13b to the balanced receiver 120 or 130.

The present invention is not limited by the phase adjuster 41 shown in FIG. 13. For example, the phase adjuster 41 may have light transmissive plates located on the optical paths of the second and fourth light intensity conversion signals 112 or 114.

(Seventh Embodiment)

The seventh embodiment of the optical phase modulation evaluating device according to the present invention will then be described hereinafter.

Figure 14:
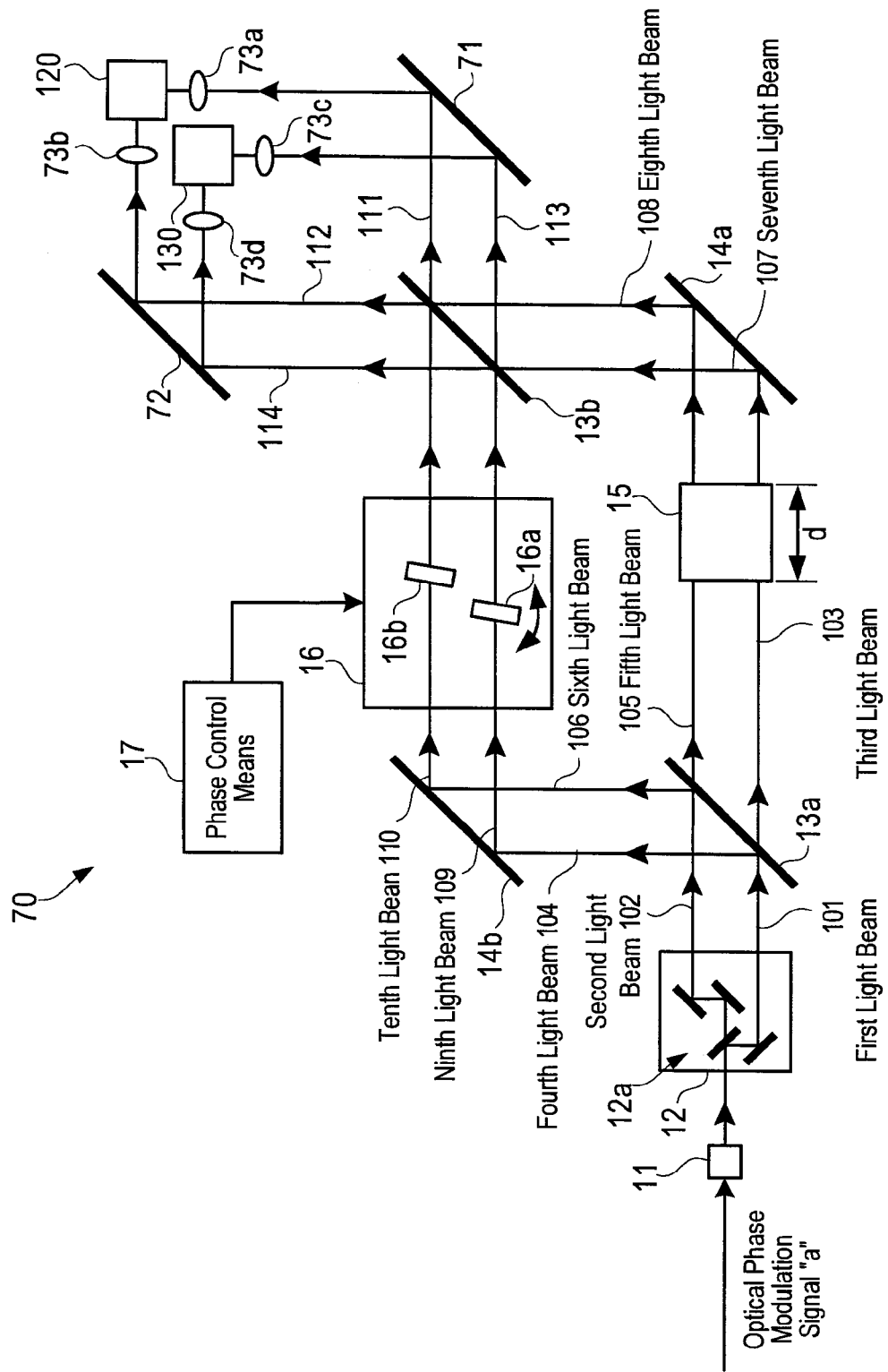
FIG. 14 is a block diagram showing the construction of an optical phase modulation evaluating module according to the seventh embodiment of the present invention.

As shown in FIG. 14, the optical phase modulation evaluating device 70 according to the seventh embodiment is the same in construction as the optical phase modulation evaluating device according to the first embodiment with the exception that the latter part of an optical phase modulation evaluating module is different from that of the optical phase modulation evaluating module 10 (see FIG. 1), and includes balanced receivers 120 and 130 shown in FIG. 4. Therefore, the constitutional units of the optical phase modulation evaluating device 70 the same as those of the optical phase modulation evaluating device shown in FIGS. 1 and 4 will not be described hereinafter and bear the same reference characters as those of the optical phase modulation evaluating device shown in FIGS. 1 and 4. Here, the signal processing device 140 and the display device 150 appearing in FIG. 4 are omitted from FIG. 14, and not described hereinafter.

The optical phase modulation evaluating device 70 further includes a mirror 71 for reflecting the first and third light intensity conversion signals 111 and 113 from the BS 13b, a mirror 72 for reflecting the second and fourth light intensity conversion signals 112 and 114 from the BS 13b, lenses 73a to 73d for focusing the first to fourth light intensity conversion signals 111 to 114, a balanced receiver 120 for receiving the first and second light intensity conversion signals, and outputting the difference between the first and second light intensity conversion signals, and a balanced receiver 130 for receiving the third and fourth light intensity conversion signals, and outputting the difference between the third and fourth light intensity conversion signals.

In the optical phase modulation evaluating device 70 thus constructed as previously mentioned, the optical phase modulation evaluating module spaced from the balanced receivers 120 and 130 is optically connected to the balanced receivers 120 and 130 without the optical fibers 19*a* to 19*d* appearing in FIG. 4. The optical path from the BS 13*b* to the balanced receiver 120 is substantially equal in length to the optical path from the BS 13*b* to the balanced receiver 130.

Additionally, the optical phase modulation evaluating device 70 may not include lenses 73*a* to 73*d*. As another example, the balanced receiver 120 may be provided with lenses 73*a* and 73*b*, and the balanced receiver 130 may be provided with lenses 73*c* and 73*d*.

Figure 15:
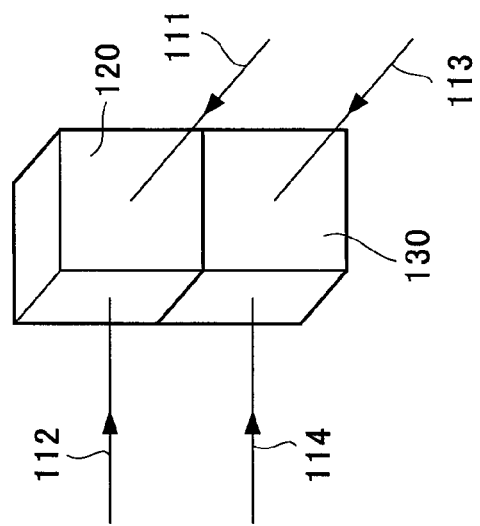
FIG. 15 is a block diagram showing two balanced receivers stacked in layers in the optical phase modulation evaluating module according to the seventh embodiment of the present invention.
Figure 16:
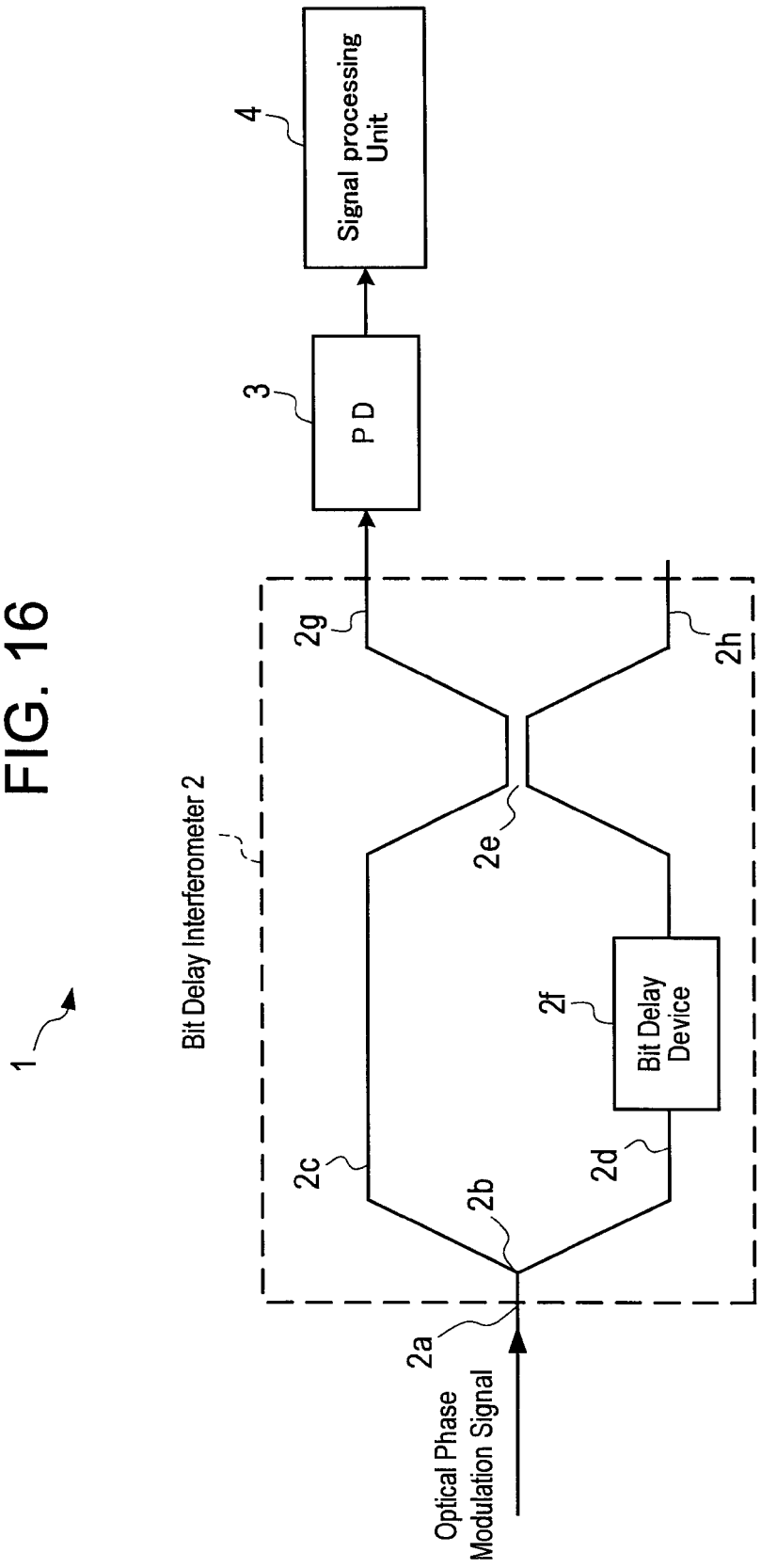
FIG. 16 is a block diagram showing the construction of a conventional optical phase modulation evaluating module.
Figure 17:
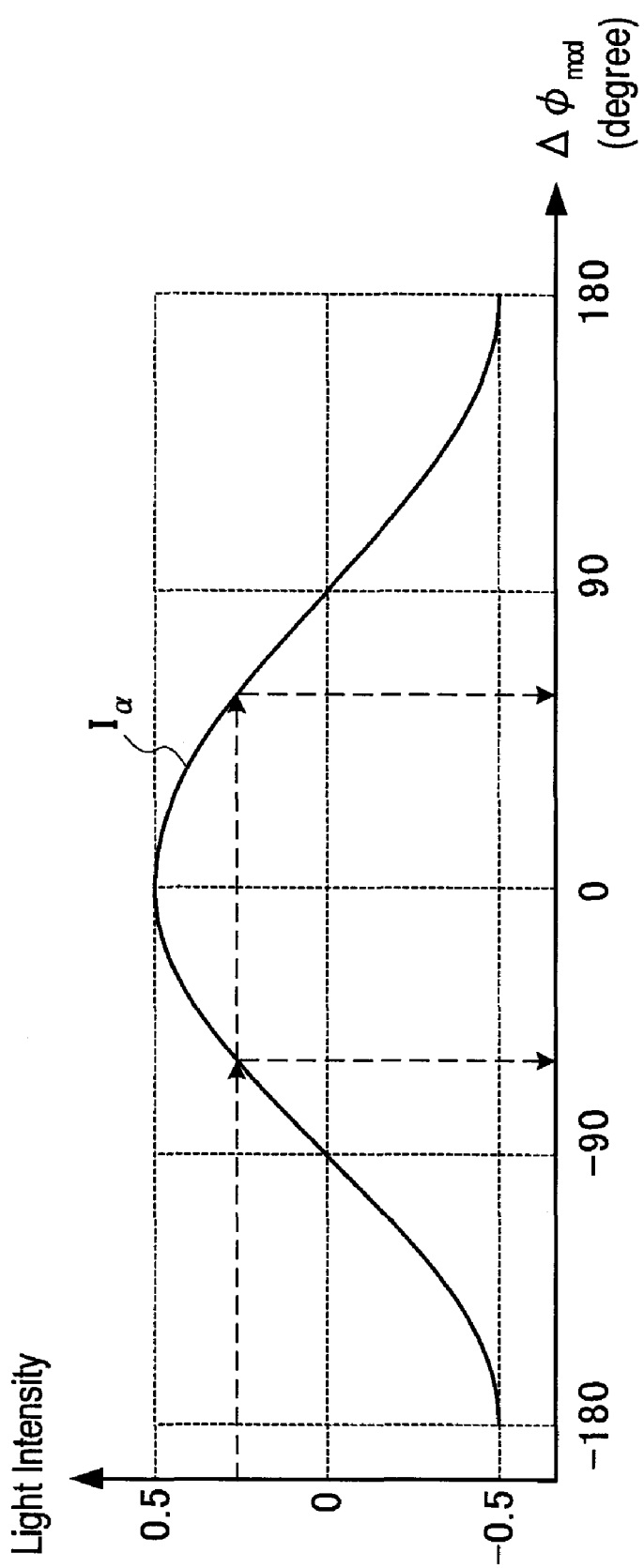
FIG. 17 is a chart showing a relation between a phase and a light intensity Iα in the conventional optical phase modulation evaluating module.

As shown in FIG. 15, a plane defined by optical axes of the interferometer outputting the first and second light intensity conversion signals 111 and 112 may be in parallel relationship with a plane defined by optical axes of the interferometer outputting the third and fourth light intensity conversion signals 113 and 114.

INDUSTRIAL APPLICABILITY

From the foregoing description, it will be understood that the optical phase modulation evaluating device according to the present invention is effective in evaluating the precise degree of modulation in phase of an optical phase modulation signal in comparison with the conventional optical phase modulation evaluating device, and useful as an optical phase modulation evaluating device for evaluating an optical phase modulation signal constituted by an optical carrier modulated in phase by a data signal in a coherent optical communication system.

The invention claimed is:

1. An optical phase modulation evaluating device, comprising:
   an optical input unit for inputting, as an optical phase modulation signal, a signal modulated in phase by a data signal at a designated symbol rate;
   an optical dividing unit for dividing said optical phase modulation signal inputted by said optical input unit into a first light beam and a second light beam;
   a beam splitter for splitting said first light beam into a third light beam and a fourth light beam, and splitting said second light beam into a fifth light beam and a sixth light beam;
   a first mirror for reflecting said third light beam to output a reflected light beam as a seventh light beam, and reflecting said fifth light beam to output a reflected light beam as an eighth light beam;
   a second mirror for reflecting said fourth light beam to output a reflected light beam as a ninth light beam, and reflecting said sixth light beam to output a reflected light beam as a tenth light beam;
   a synthesizer for combining said eighth light beam with said tenth light beam to synthesize a first light intensity conversion signal and a second light intensity conversion signal differing in phase by π radian from said first light intensity conversion signal, and combining said seventh light beam with said ninth light beam to synthesize a third light intensity conversion signal and a fourth light intensity conversion signal differing in phase by π radian from said third light intensity conversion signal, the change in phase of said optical phase modulation signal being converted to the change in light intensity of said first and second light intensity conversion signals and the change in light intensity of said third and fourth light intensity conversion signals and by said synthesizer;
   a bit delay device for adding, to said optical phase modulation signal, the delay of one bit with respect to said symbol rate on two optical paths from said beam splitter to said synthesizer through said first mirror or two optical paths from said beam splitter to said synthesizer through said second mirror;
   an optical phase difference setting means located on two optical path from said beam splitter to said synthesizer through said first mirror or two optical path from said beam splitter to said synthesizer through said second mirror, and adapted to add a designated delay to the phase of said optical phase modulation signal;
   a first light receiving unit for converting at least one of said first and second light intensity conversion signals to an electric signal; a second light receiving unit for converting at least one of said third and fourth light intensity conversion signals to an electric signal; and
   a signal processing unit for analyzing said optical phase modulation signal on the basis of output signals of said first and second light receiving units.

2. An optical phase modulation evaluating device according to claim 1, wherein
   said optical phase difference setting means is adapted to set the difference between the phase delay to be added to said ninth light beam and the phase delay to be added to said tenth light beam to π/2 radian.

3. An optical phase modulation evaluating device according to claim 1, wherein
   said bit delay device is adapted to select one of predetermined optical path lengths on the basis of said symbol rate.

4. An optical phase modulation evaluating device according to claim 1, wherein
   said bit delay device includes two or more pairs of parallel plates made of light transmissive material,
   said pairs of said parallel plates correspond to respective symbol rates, and are selectively employed to set the delay of one bit with respect to said symbol rate of said optical phase modulation signal.

5. An optical phase modulation evaluating device according to claim 1, wherein
   said bit delay device includes two or more pairs of first and second parallel plates made of light transmissive material and inclined with respect to each other,
   said pairs of first and second parallel plates correspond to respective symbol rates, and are selectively employed to set the delay of one bit with respect to said symbol rate of said optical phase modulation signal.

6. An optical phase modulation evaluating device according to claim 1, wherein
   said bit delay device is constituted by a pair of light transmissive members movable with respect to each other, said light transmissive members having the shape in cross section of a triangle, a surface of one of said light transmissive members being in face-to-face relationship with a surface of the other of said light transmissive members, the delay of one bit with respect to said symbol rate of said optical phase modulation signal is adjustable by said parallel plates.

7. An optical phase modulation evaluating device according to claim 1, further comprising:
optical phase difference adjusting means for delaying light beams on two optical path from said beam splitter to said synthesizer through said first mirror or two optical path from said beam splitter to said synthesizer through said second mirror, wherein
an initial phase (φ) corresponding to the phase difference between relative bits to be calculated by said signal processing unit is adjustable by said optical phase difference adjusting means.

8. An optical phase modulation evaluating device according to claim 1, wherein
said first light receiving unit is constituted by a balanced receiver for detecting the difference between said first and second light intensity conversion signals, and
said second light receiving unit is constituted by a balanced receiver for receiving the difference between said third and fourth light intensity conversion signals.

9. An optical phase modulation evaluating device according to claim 1, wherein
said optical dividing unit includes an optical coupler.

10. An optical phase modulation evaluating device according to claim 1, wherein
said optical phase difference setting means is constituted by parallel plates made of light transmissive material, and pivotally movable around their axes,
said optical phase difference setting means is adapted to add, to the phase, the delay corresponding to an incidence angle of light to said parallel plate or said parallel plate.

11. An optical phase modulation evaluating device according to claim 1, wherein
said optical phase difference setting means is constituted by a pair of parallel plates made of light transmissive material, and inclined with respect to each other, wherein
said optical phase difference setting means is adapted to add, to the phase, the delay corresponding to an incidence angle of light to said parallel plate or said parallel plate.

12. An optical phase modulation evaluating device according to claim 1, further comprising:
optical path length adjusting means located on an optical path from said synthesizer to said first light receiving unit or an optical path from said synthesizer to said second light receiving unit, wherein
phases of said electric signals from said first and second light receiving units are adjustable by said optical path length adjusting means.

13. An optical phase modulation evaluating device, comprising:
an optical input unit for inputting, as an optical phase modulation signal, a signal modulated in phase by a data signal at a designated symbol rate;
an optical dividing unit for dividing said optical phase modulation signal inputted by said optical input unit into a first light beam and a second light beam;
a beam splitter for splitting said first light beam into a third light beam and a fourth light beam, and splitting said second light beam into a fifth light beam and a sixth light beam;
a first mirror for reflecting said fourth light beam to output a reflected light beam as a seventh light beam, and reflecting said sixth light beam to output a reflected light beam as an eighth light beam;
a second mirror for reflecting said seventh light beam to output a reflected light beam as a ninth light beam, and reflecting said eighth light beam to output a reflected light beam as a tenth light beam;
a synthesizer for combining said fifth light beam with said eighth light beam to synthesize a first light intensity conversion signal and a second light intensity conversion signal differing in phase by π radian from said first light intensity conversion signal, and combining said third light beam with said ninth light beam to synthesize a third light intensity conversion signal and a fourth light intensity conversion signal differing in phase by π radian from said third light intensity conversion signal, the change in phase of said optical phase modulation signal being converted to the change in light intensity of said first and second light intensity conversion signals and the change in light intensity of said third and fourth light intensity conversion signals and by said synthesizer;
a bit delay device for delaying said optical phase modulation signal by one bit per second on two optical paths from said beam splitter to said synthesizer;
an optical phase difference setting means for delaying said optical phase modulation signal by a designated phase angle on two optical path from said beam splitter to said synthesizer through said first mirror and said second mirror, or two optical path from said beam splitter to said synthesizer through said bit delay device;
a first light receiving unit for converting to an electric signal in response to at least one of said first and second light intensity conversion signals;
a second light receiving unit for converting to an electric signal in response to at least one of said third and fourth light intensity conversion signals; and
a signal processing unit for analyzing said optical phase modulation signal on the basis of output signals of said first and second light receiving units.

14. An optical phase modulation evaluating device according to claim 13, wherein
said optical phase difference setting means is adapted to set the difference between the phase delay to be added to said ninth light beam and the phase delay to be added to said tenth light beam to π/2 radian.

15. An optical phase modulation evaluating device according to claim 1, wherein
said bit delay device includes an input mirror for reflecting light beams from said beam splitter, a corner mirror for reflecting light beams from said input reflector in a direction opposite to the travelling direction of said light beams from said input reflector, and an output mirror for reflecting light beams from said corner mirror to output reflected light beams to said synthesizer, wherein
said corner mirror is movable with respect to said input mirror and said output mirror in directions necessary to change in length of an optical path from said input mirror to said corner mirror and an optical path from said corner mirror to said output mirror.

* * * * *